United States Patent [19]
Caballero

[11] Patent Number: 5,431,804
[45] Date of Patent: Jul. 11, 1995

[54] NICKEL-COBALT-BORON ALLOY DEPOSITED ON A SUBSTRATE

[75] Inventor: Luis X. Caballero, Mexico City, Mexico

[73] Assignee: Diamond Technologies Company, Louisville, Ky.

[21] Appl. No.: 235,501

[22] Filed: Apr. 29, 1994

Related U.S. Application Data

[60] Continuation-in-part of Ser. No. 45,977, Apr. 9, 1993, Pat. No. 5,314,608, which is a division of Ser. No. 594,570, Oct. 9, 1990, Pat. No. 5,213,907.

[51] Int. Cl.⁶ .......................... C25B 1/00; C25B 11/04
[52] U.S. Cl. .................................... 204/129; 204/128; 204/293
[58] Field of Search ..................... 204/293, 128, 129

[56] References Cited

U.S. PATENT DOCUMENTS

| | | | |
|---|---|---|---|
| 2,743,177 | 4/1956 | Cape | 75/171 |
| 3,045,334 | 7/1962 | Berzins | 29/194 |
| 3,268,353 | 8/1966 | Melillo | 117/47 |
| 3,295,999 | 1/1967 | Klein et al. | 106/1 |
| 3,297,418 | 1/1967 | Firestone et al. | 29/199 |
| 3,378,400 | 4/1968 | Sickles | 117/168 |
| 3,432,338 | 3/1969 | Sickles | 117/130 |
| 3,533,922 | 10/1970 | Semienko et al. | 204/43 |
| 3,562,000 | 2/1971 | Parker | 117/130 |
| 3,674,447 | 7/1972 | Bellis | 29/196.6 |
| 3,753,667 | 8/1973 | Metager et al. | 29/195 |
| 3,926,844 | 12/1975 | Benczur-Urmossy | 204/1 R |
| 4,036,709 | 7/1977 | Harbulak | 204/48 |
| 4,279,707 | 7/1981 | Anderson et al. | 204/43 T |
| 4,470,893 | 9/1984 | Oda et al. | 204/293 |
| 4,544,473 | 10/1985 | Ovshinsky et al. | 204/293 |
| 4,621,026 | 11/1986 | Robinson | 204/35.1 |
| 4,661,216 | 4/1987 | Anderson et al. | 204/44.5 |
| 4,833,041 | 5/1989 | McCombs | 428/610 |

FOREIGN PATENT DOCUMENTS 61-159594 7/1986 Japan.
62-267192 11/1987 Japan.

OTHER PUBLICATIONS

*Electrolytic Hydrogen Plants/The Electrolyser Corporation Ltd./Publ. Tecl EHP0187.*
*Electrodeposition of Nickel By An Asymmetric Periodically Reversed Step Current* O. Teschke and D. Menez Soares/ Instituto de Fisica, Laboratorio Hidrogenio, Unicamp, C. P. 6165,13,100 Campinas, SP, Brasil/-J.E.ectrochem. Soc.: *Electrochemical Science and Technology/*Feb. 1983.

*Primary Examiner*—John Niebling
*Assistant Examiner*—Kishor Mayckar
*Attorney, Agent, or Firm*—Polster, Lieder, Woodruff, & Lucchesi

[57] ABSTRACT

A crystalline ternary alloy of nickel, cobalt and boron has been found to have multiple uses. The alloy has a composition of, by weight, 50–75% nickel, 25–50% cobalt, and 1–5% boron. Structurally, the alloy consists of 50–75% $Ni_2B$ crystals and 25–50% $Co_2B$ crystals contained in a matrix of nickel cobalt. The alloy has been found to have high catalytic capabilities and decreases the energy requirements for the electrolytic production of gasses such as hydrogen and halogens. The alloy also has good magnetic properties indicating that it can be used as a coating for a magnetic data storage media, or a thin film for a read/write head which writes to and reads from the magnetic storage media. The alloy has a magnetorestrictive coefficient that is substantially zero or negative, a magnetic saturation where $4\pi M_s$ is greater than 20 KGauss, a coercivity of approximately 1.24, an anisotropy of 3.74, and a magnetic permiability in excess of 1000.

11 Claims, 14 Drawing Sheets

NICKEL-COBALT-BORON ALLOY DEPOSITED ON A SUBSTRATE

CONTINUING APPLICATION DATA

This application is a continuation-in-part of application Ser. No. 08/045,977, filed Apr. 9, 1993, now U.S. Pat. No. 5,314,608 which is a Divisional application of application Ser. No. 07/594,570, filed Oct. 9, 1990, now U.S. Pat. No. 5,213,907, both of which are incorporated herein by reference.

BACKGROUND OF THE INVENTION

This invention relates to an alloy containing nickel, cobalt, and boron (Ni-Co-B), and the use of the alloy as a catalyst for the electrolytic production of gasses and as a thin film for use with magnetic recording media and read/write heads therefor.

Gasses, such as hydrogen and halogens (especially chlorine) are in great demand. Nickel and mercury are commonly used as catalysts when such gasses are electrolytically produced. Nickel has a high resistivity and low conductivity and therefore requires an excessive amount of energy to produce gasses when used as a catalyst. Therefore, hydrogen is commonly produced by cracking of compounds such as methane.

Mercury is commonly used as a catalyst for the electrolytic production of chlorine from NaCl. When chlorine is produced in this manner, the sodium combines with the mercury. This requires a second electrolytic process to separate the sodium from the mercury to maintain the catalyst. Further, mercury is toxic, requiring the use of extra precautions when mercury is used.

SUMMARY OF THE INVENTION

One of the objects of the present invention is to provide a new and improved metal alloy which is dense, hard, ductile and highly reflective, as deposited.

Another object is to provide such a metal alloy which is also resistant to heat, corrosion, and wear.

Another object is to provide such a metal alloy which has particular utility for coating surfaces, and which, because of its many superior physical and chemical properties, can be advantageously substituted for chrome, hard chrome, nickel-chrome and nickel-palladium coatings, as well as for other highly reflective and corrosion resistant products, such as laser mirrors.

Another object is to provide such a metal alloy and method which, when applied to suitable substrates of different configuration, form various implements with desired physical and chemical properties.

Another object is to provide such a metal alloy which may be used as a catalyst in the electrolytic production of gasses.

Another object is to provide such a metal which may be used as a thin film or coating for magnetic recording media and read/write heads therefor.

These and other objects will become apparent to those skilled in the art in light of the following disclosure and accompanying drawings.

In accordance with one aspect of this invention, generally stated, there is provided a novel ternary nickel-cobalt-boron alloy containing, by weight, approximately 49–82.5% nickel, 15.5–49% cobalt, and 1–5% boron. Preferably, the ratio of nickel to cobalt in the composition is between about 1:1 and 4:1, most preferably between about 1:1 and 3:1. The preferred compositions consist, at their exposed surface, of about 49–74% nickel, about 24–49% cobalt and about 1.9–2.5% boron.

Both physical and chemical analyses of the epitaxial electrolytic deposition of the preferred alloys reveal a homogeneous crystalline structure composed of nickel-cobalt boride crystals in a nickel-cobalt lattice or matrix. The crystals appear to consist essentially of 50–75% $Ni_2B$ and 25–50% $Co_2B$. The lattice appears to be formed of an alloy of nickel and cobalt, the ratio of nickel to cobalt being determined by the bulk composition of the coating.

The properties of the alloy produced by the present invention permit it to be used as a substrate for abrasives such as diamonds used in high-temperature cutting tools. They also permit it to form superior mirrors, such as a mirror used in a pumped laser. In accordance with another aspect of the invention, the laser mirror may be uniquely formed with concavities.

The crystalline ternary alloy has been found to have high catalytic capabilities and decreases the energy requirements for the electrolytic production of gasses such as hydrogen and halogens. The alloy also has good magnetic properties indicating that it can be used as a coating for magnetic data storage media, or a thin film for a read/write head which writes to and reads from the magnetic storage media. The alloy has a magnetostrictive coefficient that is substantially zero or negative, a magnetic saturation ($M_s$) of 1.614 KGauss, a coercivity of approximately 1.24, an anisotropy of 3.74, and a magnetic permeability in excess of 1000.

DESCRIPTION OF THE PREFERRED EMBODIMENT

Deposition of the alloy of U.S. Pat. No. 5,213,907 (which is incorporated herein by reference) on a substrate is preferably accomplished by electrolysis. A pair of bagged anodes made of electrolytic nickel and a cathode, the substrate to be coated, are connected to a power source and are immersed into the plating bath to pass a current therethrough. The power source produces a pulsed square wave current at a frequency of 1000 Hertz and having a 30% duty cycle. The square wave preferably has a $T_{on}$ of 0.3 milliseconds, a $T_{off}$ of 0.7 milliseconds, and an average pulse current density of between 0.018 to 0.076 amps/cm$^2$. By electrolysis, the pulsed current produces $O_2$ at the anodes and $H_2$ at the cathodes when it is on. When it is off, the diffusion layer of gas disperses. The alternate production of $O_2$ and $H_2$ and the disappearance of the diffusion layers prevents the oxidation on the anodes and prevents polarization at the substrate (cathode).

Suitable substrates are those which can be activated on their surface, such as metals composed of iron, steel, stainless steel, nickel, cobalt, chromium, titanium, aluminum, tin, zinc, platinum, copper, brass, silver, and tungsten alloys and superalloys, and various other. Nonmetallic compounds, such as glass, ceramics and plastics may also be used as a substrate if they are sensitized. Sensitizing a non-metallic substrate is commonly performed by electroless plating of a film of tin and palladium on the surface of the tin. This is done, for example, by immersing the compound in a solution of stannous chloride and then immersing it in a solution of a metal salt, the metal being palladium.

Prior to placing the substrate in the plating bath, it is pretreated, washed and activated. The substrate is first pretreated by cleaning first with alcohol, preferably isopropanol, and then cleaning it with an anionic solution. Isopropyl alcohol is preferred for the alcohol wash because it only has three carbons and thus, does not leave a carbon film on the substrate. Using an alcohol having more carbons may result in a carbon film on the substrate.

Figure 1:
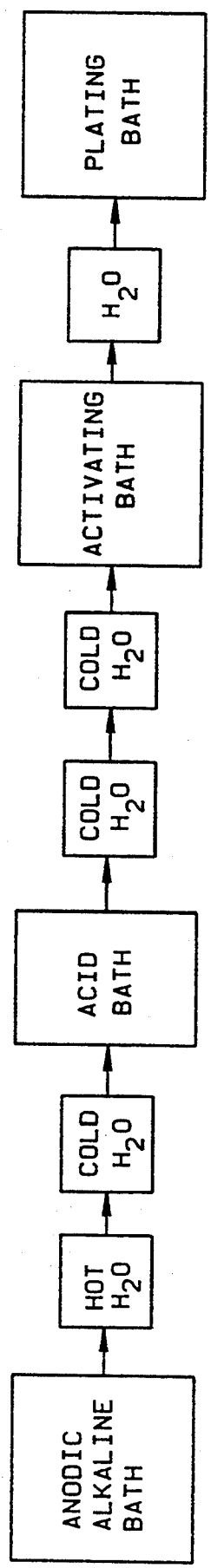
FIG. 1 is a flow chart describing the steps involved in treating a substrate prior to plating.
Figure 2:
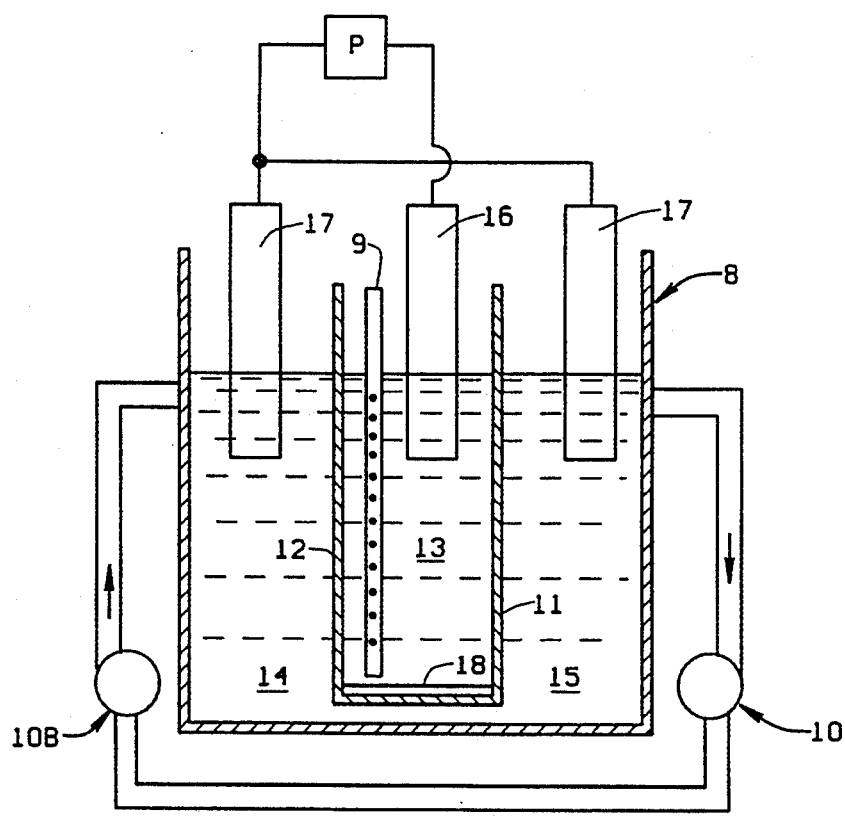
FIG. 2 is a schematic drawing of a tank used for the plating process.
Figure 10:
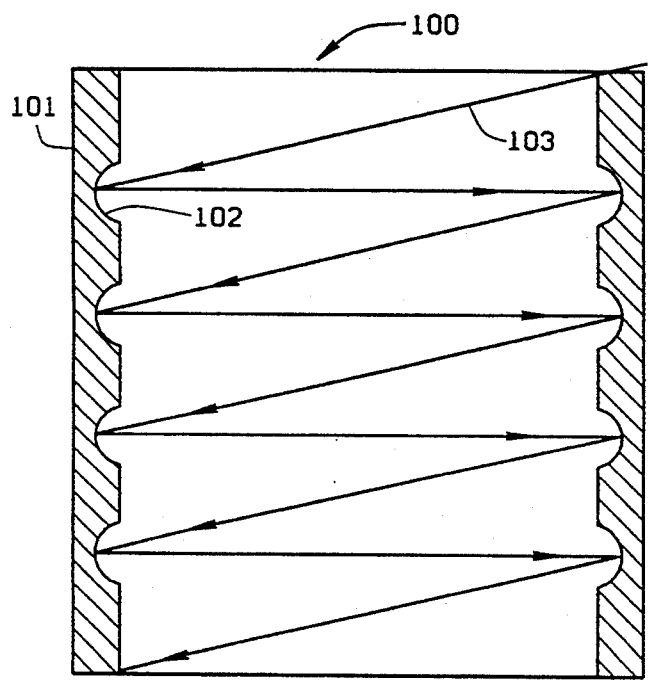
FIG. 10 is a cross-sectional view of a laser chamber.

After pretreatment, the substrate is anodically cleaned, as shown in the FIG. 1 flow chart, in an alkaline solution 1 for two minutes in the presence of a negative current having a density of 0.08 amps/cm$^2$. The solution preferably contains NaOH, $Na_2CO_3$, $NaSiO_3$, and $Na_5P_3O_{10}$. It is then rinsed in hot distilled or deionized water 2a and cold distilled water 2b which removes all the alkalines except the sodium silicate. The silicate gives a protective layer to the substrate. The substrate is then immersed in an acid bath 3 for five minutes. The acid bath contains 1% sulfuric acid and 0.1% hydrochloric acid. The substrate is then rinsed in cold distilled or deionized water 4.

After the alkaline and acid baths, the substrate is activated, both anodically and cathodically, in an activator solution 5 of HCl and $NiCl_2$. It is first anodically activated by passing a negative current through the activator bath for two minutes. This removes the top layer of the substrate. It thus removes the oxides which have formed on the substrate surface. In the same solution, the substrate is cathodically activated, for six minutes, by passing a positive current through the activator bath. Cathodic activation forms a metastable layer of nickel on the substrate. The substrate is then slowly and gently dipped in distilled water 6 and thereafter placed in the plating bath 7 for the plating process.

The washing of the substrate after the alkaline and acid baths preferably is performed in two separate tanks of water, 2a, 2b and 4a, 4b. The use of a double rinse better removes the bath solution. Thus, the prior bath will not contaminate the next bath.

The substrate may be pretreated any time before being placed in the alkaline bath for anodic cleaning. The substrate should, however be wetted before being placed in the alkaline bath. Further, once the substrate is placed into the anodic bath, the substrate should be moved from bath to bath quickly, so that there will always be a protective layer of water on the substrate. This water layer prevents contaminates in the air from adhering to the substrate. Thus, the substrate is clean and free of contaminates before being placed in the plating bath.

One advantage of this cleaning process is that, as just mentioned, the substrate is free of contaminant, such as oxides when placed in the plating bath. Thus, sequestering agents, as are described by Berzin in U.S. Pat. No. 3,045,334, are not needed to prevent precipitation or the formation of sludge in the plating bath.

The plating bath contains nickel and cobalt salts, boric acid, and a amino-borane. The bath preferably includes, per liter of solution:

0.75–1.1 mole nickel sulfate ($NiSO \cdot 7H_2O$)

0.250–0.3125 moles nickel chloride ($NiCl \cdot 6H_2O$)

0.0625–0.125 moles cobalt sulfate ($CoSO \cdot 7H_2O$)

0.500 moles of boric acid ($H_3BO_3$) and 0.0125 moles of dimethylamino borane (DMAB) (($CH_3)_2NH \cdot BH_3$).

The bath also includes 2 ml of a wetting agent and 0.25 ml of a stress relief agent per liter of solution. The wetting agent, which may be a sulfonate or an alcohol, effectively slows down the rate at which the nickel, cobalt and boron ions reach the substrate. This thereby provides a more uniform deposition of the alloy on the substrate. The stress relief agent prevents hydrogen from being trapped in the alloy and between the alloy and the substrate. If hydrogen were trapped in the alloy, it would become brittle. Thus the stress relief agent aids in producing a ductile alloy.

The bath may be prepared in a 40 cm × 30 cm × 30 cm tank 8 which is equipped for air agitation 9 and pump filtration 10 and includes an automatic teflon heater, a level control, a pH control, and a monitor to monitor the chemical analysis solution. The tank is divided into three sections by two diaphragms 11 and 12 of microscopically perforated acrylic. The center section provides a cathodic cell 13 and the two outer sections provide anodic cells 14 and 15. The substrate 16, which is used as the cathode, is immersed in the cathodic cell. An electrolytic nickel bar forms an anode 17 and is bagged with polypropylene. One such bar is placed in each anodic cell. The sides of the anodes are preferably adjustable, as by masking, to obtain the proper anode-cathode ratio of approximately 1:1 to 4:1. The anodes are preferably about 7 to 8 inches long for tank 8, which is preferably about 60% to 70% of the length of the anode bars, which are used to connect the anode to the source of power.

Circulation of the bath in the tank is provided by the filtration and air agitation systems. The circulation and agitation helps to keep the anodes clean, benefits the alloy forming reaction by keeping ion concentrations equal in all areas of the tank, and aids in the brilliant appearance of the alloys. A pump 10 continuously pumps the plating bath in the anodic cells through an activated carbon filter 10a to provide the circulation and to remove contaminates and any cobalt or nickel borides which may precipitate out. The air agitation system operates at 0.25 psi to circulate the solution in the cathodic cell.

An aqueous solution containing the proper amount of nickel and cobalt salts, boric acid, and amino-borane is created in the tank. The bath is adjusted to a pH of between 3.8 and 4.0 with sulfuric acid or ammonia hydroxide and is heated to approximately 150° F.±1%. The catalyst 18 is placed in one of the cells, preferably the cathodic cell, formed by the diaphragms. The solution is kept at a constant level to keep the components in equilibrium. The bath is continuously agitated by the filtering and the air agitation systems. This further reduces residue or sludge production if any.

During the plating procedure, the cobalt ions are replenished in accordance with the amount of cobalt ions removed from the solution. The bath has unlimited life if the cobalt that is taken out is replaced. The remaining constituents are equilibrated by periodic analysis. The pulse current breaks down the wetting and stress relief additives in the bath. They must therefore be replenished periodically. The current parameters and working conditions should remain constant, and contaminants eliminated, by known care and purification techniques.

The prepared surface is immersed into the bath to a depth of approximately two inches, with the the current on, for coating with the Ni-Co-B alloy. The thickness of the coating is dependant on the surface area of the substrate, the current density and the time of the plating process.

The nickel-cobalt-boron alloy has been found to have remarkable physical and chemical properties, as deposited. It is highly brilliant and reflective, has a hardness in the range of 900–1158 as deposited and 1360 when heat treated, as measured using a Vickers Hardness Measuring Device having a 100 gm weight (VPN 100 gm). It is also highly resistant to heat, corrosion, and wear as deposited. The coating is not porous. Its corrosion resistant qualities have been found to be on par with rhodium, and surpass the qualities of chromium, chromium-molybdenum and lead-cadmium alloys produced by electrolysis or sintering, as well as with electroless nickel-boron or nickel-cobalt-thallium-boron alloys. The brilliant appearance of nickel-cobalt-boron alloy can compete with the appearance of chrome or rhodium. Its hardness is greater than that of hard chrome. Because of its high melting point (1291° C.) and its excellent resistance to wear and corrosion, this novel alloy has particular utility for coating surfaces of articles which, under normal use, are subject to highly abrasive rubbing or sliding conditions under high pressure and temperature. This alloy can be advantageously substituted for chrome, hard chrome, nickel-chrome, and nickel-palladium coatings.

The alloy has been found to structurally diffuse and integrate into the substrate along an interface between the alloy and substrate. A polar-covalent (chemical) bond is formed at the interface to bond the alloy to the substrate. The catalyst provides the energy to produce the polar-covalent bond, without it being used up. Thus, the catalyst need not be replaced, as long as it is cleaned periodically to remove any impurities. The bonding is also enhanced by the presence of the metastable layer of nickel formed on the substrate during activation.

All analyses of the metal alloy coating were performed with a Joel Scanning Electron Microscope, model JSM-35 CF, with a computerized Eadox Ortec System 5000. X-ray analysis revealed that the deposit of nickel-cobalt-boron is a homogeneous crystalline structure comprising nickel and cobalt borides being contained in a matrix of nickel-cobalt.

Figure 3A:
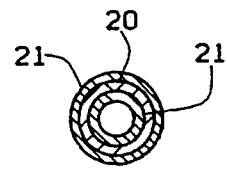
FIG. 3A is a cross-sectional view taken through line 3a–3c at FIG. 3.
Figure 3:
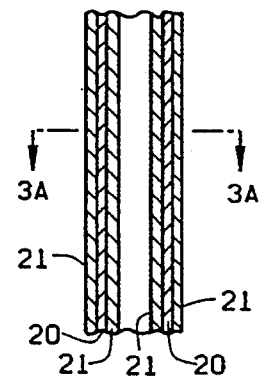
FIG. 3 is a view in cross-section of a cylindrical tube or pipe substrate showing that the plating process will coat both the inner and outer surfaces of the substrate.

The plating may be coated on implements and products of various shapes and sizes, such as the cylindrical tube or pipe 20 (see FIG. 3) with the plating 21 coating the inner and outer surfaces of the tube 20. Reference is also made to the discussion in EXAMPLE 2 explaining the specifics of the process as applied to the tube or pipe 20. It will also be appreciated that various other implements and products may be coated with the plating alloy of the present invention.

Figure 4:
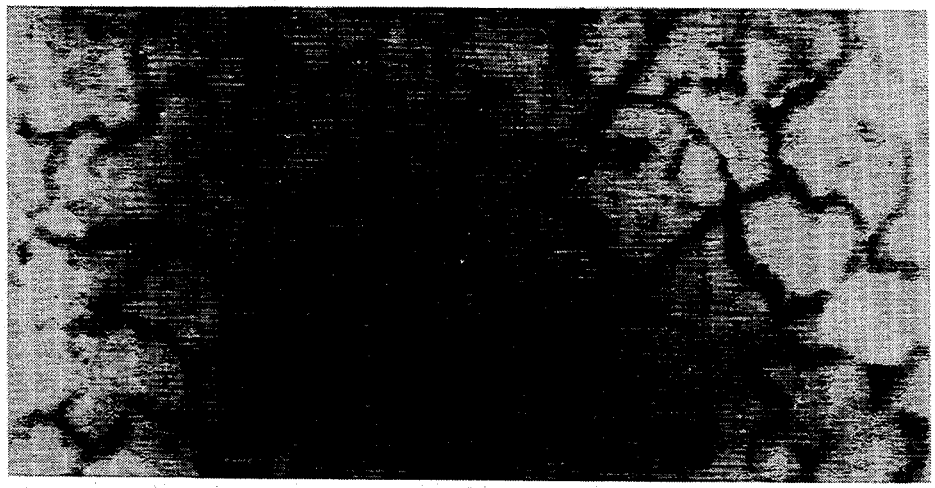
FIG. 4 is an electron photomicrograph, enlarged 1000X, of a coating of an alloy in accordance with Example 1 of the present invention on stainless steel, after treatment with NaOH for 60 seconds and acid etching for 6 seconds in 85% $H_2O$, 10% HF and 5% $HNO_3$.

Because of its high reflectivity as deposited (approximately 94.5%) and its resistance to acid corrosion, the Ni-Co-B alloy may be suitably used as a reflective surface in a laser 100. A preferred embodiment of a laser mirror 101 (FIG. 4) has a plurality of small dimples 102 thereon. In planar mirrors the radiation reflects back upon itself. However, the dimples 101 of laser mirror 100 prevent this, as can be seen by arrows 103 indicating the flow of reflected radiation at an angle from each dimple. This allows for an increase in the efficiency of the stimulated radiation. In producing mirror 101, a substrate which is predimpled and has the desired shape is coated with the alloy as described above.

The following examples disclose details of the bath composition, process condition and results of analyses which give the representative properties of the alloy of the present invention. The following examples are illustrative and not to be taken as limiting.

EXAMPLE 1: PLATING OF ALLOY ON STAINLESS STEEL

The plating solution was prepared by heating thirty-two liters of distilled water to 150° F. Eight moles of $NiCl \cdot 6H_2O$ were dissolved in the hot distilled water. Thirty-two moles of $NiSO \cdot 7H_2O$ and four moles of $CoSO \cdot 7H_2O$ were added to the $NiCl_2$. When the entropy of the system reach an optimum point (the solution is well mixed), sixteen moles of $H_3BO_3$ were added and dissolved. When the solution passed easily through a 325 mesh sieve, it was cooled to approximately 100° F.–110° F. 0.4 moles of DMAB (($CH_3$)$_2$NH·$BH_3$) were then added to the bath. The DMAB is previously dissolved in distilled water or cool solution of the plating bath. After mixing was complete, the catalyst, in a ratio 1 cm$^2$/liter (32 cm$^2$) was placed in the bottom of the cathodic cell. The temperature of the bath was elevated to, and held constant at 150° F.±1%. The pH of the solution was adjusted to 3.8 to 4.0 using $H_2SO_4$. Lastly, 2 ml/liter of wetting agent and 0.25 ml/liter of stress relief agent were added.

A piece of stainless steel 305, 30 cm long by 0.159 cm in diameter, was pretreated as indicated above. It was immersed for two minutes in an anodic alkaline bath without sodium cyanide using a regular DC current at 0.08 amps/cm$^2$. After rinsing in hot and cold distilled water, it was activated anodically and cathodically as described above. After being activated, the substrate was immersed in the tank's cathodic cell. The power source was set to have a frequency of 1000 Hertz with a $T_{on}$ of 0.3 milliseconds and a $T_{off}$ of 0.7 milliseconds, an average current density of 0.03749 amps/cm$^2$, an average current of 0.53 amps, and a total current of 10.3 amps/minute.

After 19 minutes, 30 seconds, the stainless steel bar was removed from the bath. After rinsing, the bar was measured with a Sylvac Fowler Ultra-Cal II Digital Micrometer connected to a computer. It was found to have a diameter of 0.162 centimeters. Thus, it had a coating of 0.003 cm. The bar was measured at two points, A and B, two centimeters from each end of the bar, a point C, at the center of the bar, and at points in the center of the lines A-C and B-C. No variation in the thickness of the coating was observed. The nickel-boron-cobalt alloy was brilliant and reflective in appearance, and smooth and sliding to the touch. Electron microscopic examination of the alloy surface revealed a non-porous crystalline structure of the alloy. (FIG. 4) Scanning electron microscopy (SEM) examination revealed that the composition of the crystalline deposit at the outermost surface was 55.05% $Ni_2B$ and 44.95% $Co_2B$. Atomic absorption revealed the coating was comprised of 53.8% Ni, 43.97% Co, and 2.19% B at the outermost crystalline surface.

The 30 cm coated bar was bent into a 180° semicircle and left in that position for 24 hours. Examination with an optical microscope showed no crack or fracture in the middle of the bend, showing that the alloy is ductile.

The surface of the coated bar was found to have a hardness of 1158 using a Vickers Hardness Measuring Device having a 100 gm weight (VPN 100 g). This is greater than the hardness of commercial grade nickel or nickel-boron alloy formed in an electroless system and is advantageously comparable with hard chrome.

The bar was tested for corrosion resistance in a fog cell chamber for 80 hours. A commercially available bar of chromium-molybdenum alloy was used as a comparison. The chromium-molybdenum alloy developed superficial perturbations and lost brilliance. The nickel-cobalt-boron alloy coated bar, however, showed no superficial perturbations and maintained its original brilliance and smoothness. This showed that the Ni-Co-B alloy is highly resistant to corrosive conditions.

The nickel-cobalt-boron coated bar was compared against a lead-cadmium alloy coated bar for adhesion of the alloy coating to the substrate by dry-cutting the two bars transversely with a diamond cutting wheel. The nickel-cobalt-boron alloy was found to have excellent adhesion. The high temperature produced by the dry cutting did not change any physical properties, including its appearance. The other bar showed fair adhesion but the level of hardness dropped, showing mechanical properties of lead-cadmium alloy change with temperature.

A piece of the nickel-cobalt-boron alloy coated bar, approximately 30 mm long was connected to a Moto-Tool, an abrading device produced by the Dremel division of Emerson Electric Co., operating at 28,000 rpm to test the alloy for resistance to wearing conditions. The nickel-cobalt-boron alloy coated bar was rotated against the edge of a piece of glass for 300 seconds. A drop of water was used as lubrication. The alloy was optically examined with a microscope. Its surface showed no marks or damages, and its appearance remained brilliant and smooth. Upon measuring the bar, no change in the thickness of the alloy coating was found, showing that the nickel-cobalt-boron alloy is highly resistant to wear.

A piece of the coated bar was tested for adhesion, abrasion, and wear resistance using a Leco Device. A highly abrasive disk was rotated against the alloy for 5 seconds at 219 rpm. The coating was found not to have been damaged by the abrasive disk.

A small piece of the coated rod was placed in a Dietart Furnace with Vari Temp, a refractory chamber and a porcelain crucible. The alloy was found to have a melting point of 1291° C.±27° C.

EXAMPLE 2: PLATING OF ALLOY ON BRASS

The procedures of Example 1 were followed to deposit the nickel-cobalt-boron alloy on a brass pipe 20 2.6360 cm long, having an inner diameter of 1.195 cm, an outer diameter of 1.275 cm, and a wall thickness of 0.080 cm. The plating bath was prepared in the same manner as the bath of example 1, however, it had 9 moles of NiCl·$6H_2O$ and 3 moles of CoSO·$7H_2O$. The power source was altered to have an average current of 0.74 amps and a total current of 14.41 amps/min. The remaining power source parameters were the same as in Example 1. The brass pipe was immersed in the bath for 19 minutes, 28 seconds. It was then rinsed with water and dried.

The cylinder was measured, as before, and was found to have an 0.003 cm coating 21 of the alloy on both the inner and outer surfaces of the cylinder (i.e. the wall thickness increased by 0.006 cm.). The fact that the coating on both the inner and outer surfaces of the cylinder were of the same thickness shows that the plating bath has a high throwing power.

Figure 5:
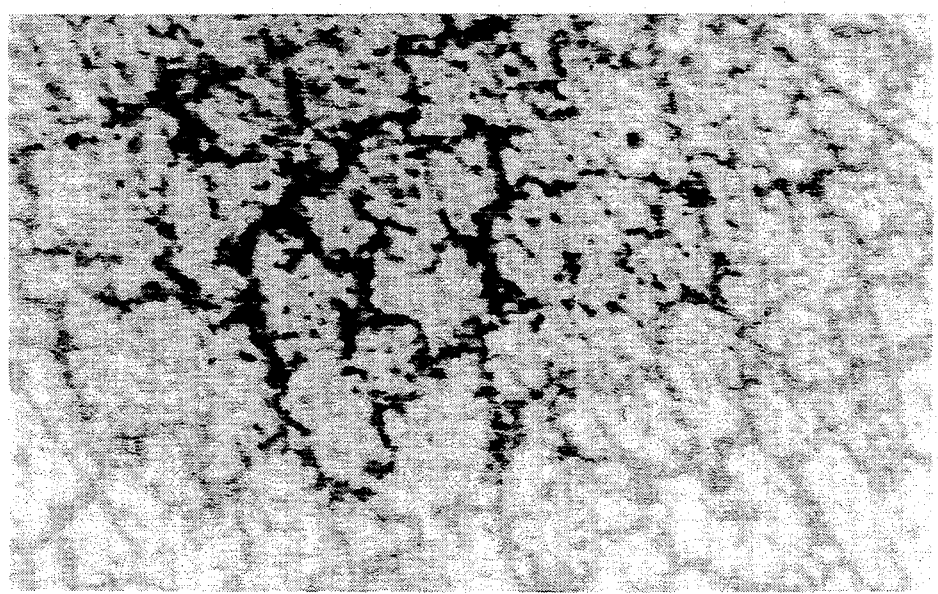
FIG. 5 is an electron photomicrograph, enlarged 1000X, of a coating of an alloy in accordance with Example 2 of the present invention on brass, after treatment with alkali and acid etching.

Again the alloy felt slippery and smooth to the touch and appeared brilliant. X-ray examination showed that the outer diameter of the piece had the same structure as in Example 1. (FIG. 5) SEM examination revealed that the crystalline deposit had a composition of about 32.13% $Co_2B$ and 67.87% $Ni_2B$ at the surface. By atomic absorption, it was determined that the alloy was 66.38% Ni, 31.43% Co, and 2.19% B at the outermost crystalline surface. The hardness of the alloy was found to be 1086 VPN 100 g.

EXAMPLE 3: PLATING OF ALLOY ON COPPER

The procedure of Example 1 was followed to deposit the nickel-cobalt-boron alloy on a strip of copper 2.6 cm wide, 16 cm long and 1.7 mm thick. The bath was prepared in accordance with the procedures of Example 1, but was altered to have 10 moles $NiCl \cdot 6H_2O$ and 2 moles $CoSO \cdot 7H_2O$. The power source was altered to have an average current of 3.1 amps and a total current of 81.12 amps/minute. The remaining power source parameters remained the same as in Example 1. The copper strip was immersed in the plating bath for 26 minutes, 10 seconds. It was then removed from the solution and rinsed with water.

The quality of the coated copper strip appeared the same as in Examples 1 and 2. The alloy coated copper strip did not lose its flexibility when bent in both directions to form a 180° semicircle. Optical, microscopic examination of the bent bar revealed no cracks, fractures, or imperfections, thereby demonstrating the alloy's ductile character. The hardness was found to be 940 VPN 100 g.

One end of the coated strip was polished, cleaned with NaOH at room temperature and etched with a solution of 85% $H_2O$, 10% HF, and 5% $HNO_3$ to prepare it for metallurgical examination. Electron microscopic examination showed that the nickel-cobalt-boron alloy was diffused into the copper matrix at its two interfaces.

Figure 6:
FIG. 6 is an electron photomicrograph of the alloy enlarged 400x, plated on copper after treatment with alkali and acid etching and shows that the alloy is homogeneous through its thickness, the alloy being made in accordance with Example 3.

SEM examination revealed that the crystalline deposit on the copper strip had a composition of 26.48% $Co_2B$ and 73.52% $Ni_2B$. (FIG. 6) Atomic absorption revealed the composition of the alloy in terms of nickel, cobalt and boron was 71.9% Ni, 25.9% Co, and 2.2% B at the outermost crystalline surface.

The alloy's resistance to acid corrosion was tested by covering the plated strip for 120 seconds with various acids. It was covered with 50% $HNO_3$ solution; concentrated HCl; concentrated $H_2SO_4$; concentrated HF; concentrated $H_3PO_4$; concentrated $HClO_4$, and aqua regia (25% $HNO_3$ and 75% HCl). After testing with the acids, the alloy coating remained brilliant, demonstrating the alloy's high resistance to acid corrosion.

A Guild Reflectometer with a photoelectric cell and a coated sphere of magnesium oxide was used to measure the reflectivity of a piece of the strip after it was polished. The polished alloy was found to have a reflectivity of 94.5%. This is better than rhodium or chromium, which have reflectivity values of 92.31% and 85.71%, respectively.

It has been found that by increasing the current density for example, up to 0.076 amps/cm$^2$, similar reflectivity values can be obtained without polishing. The reflectivity of the alloy is believed to be due to the orientation of the boride crystals in the 1-1-1 plane.

EXAMPLE 4: PLATING OF ALLOY ON TITANIUM ALLOY

The procedure of Example 1 was followed to deposit the nickel-cobalt-boron alloy on twenty tips of TiAl6V4, an alloy made of titanium (90%), aluminum (6%) and vanadium (4%) and commonly used for turbine blades. The exposed surface of each tip was 1.02 cm long and 0.34 cm wide. Each piece also included a 0.010 inch lip down its sides. The rest of the surface was isolated using a special mask, The tips were attached to a suitable device for immersion in the plating solution.

The bath of Example 1 was used. The power source was set to have an average current of 0.26 amps and a total current of 3.3 amps/minute. The remaining power source parameters were the same as in Example 1.

Before immersion of the cathode into the nickel-cobalt-boron solution, the tips were pretreated as indicated above, and their exposed surfaces were activated with a solution of $I_2$ and methanol. When the methanol was evaporated, the device was immersed into the nickel-cobalt-boron solution. After 13 minutes the device was washed with water.

Figure 7:
FIGS. 7 and 7a are cross-sectional views enlarged 500x of the alloy plated on a titanium alloy substrate after treatment with alkali and acid etching showing that the alloy and substrate diffused into each other and that the alloy is atomically bonded to the substrate.
Figure 7A:
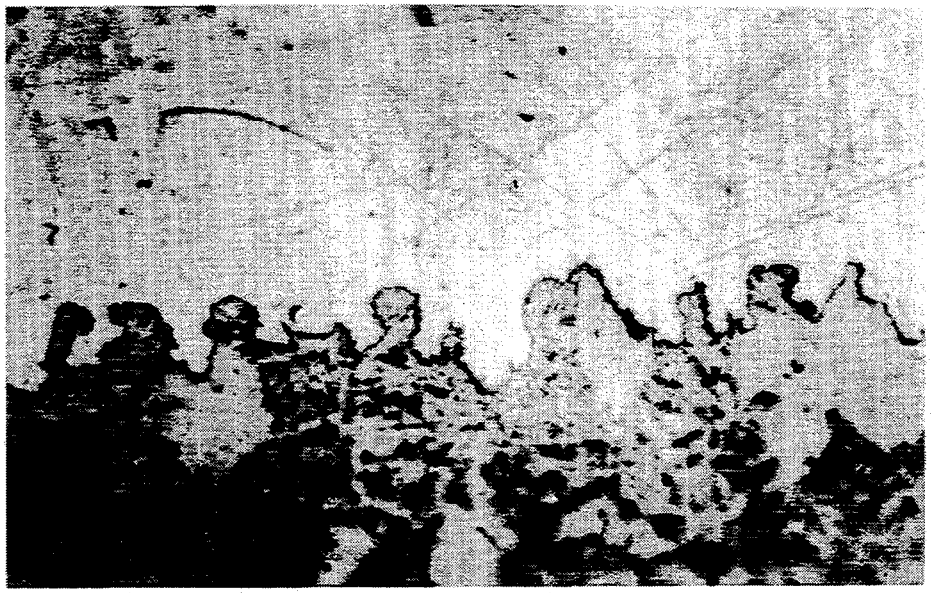

One of the tips was cut and prepared for metallurgic examination. Electron microscopic examination revealed that the nickel-cobalt-boron alloy diffused into the TiAl6V4 at the interface. The remaining 19 tips were placed in a furnace for 90 minutes at 675° in an Argon atmosphere at 1 Torr of pressure. After cooling, the tips were washed in NaOH and rinsed with distilled water. A second tip was cut and prepared for metallurgic examination. X-ray examination showed diffusion of the nickel-cobalt-boron alloy into the TiAl6V4 matrix. In both the heat-treated and untreated tips, a polar-covalent bond between the alloy and substrate was found at the interface. (FIGS. 7 and 7A) There was found to be no difference between diffusion of the alloy into the substrate of the heat treated tip as compared to the tip which was not heat treated, demonstrating the alloy's resistance to high heat conditions. The hardness of the heat treated alloy was found to be 1360 VPN 100 g.

EXAMPLE 5

Using the same procedures as in Examples 1 and 4, the nickel-cobalt-boron alloy was deposited on 30 small pieces of INCONEL-601 (a nickel-based super alloy) having dimensions of 2.5 cm×1.0 cm×3 mm. The bath of Example 1 was used. The power source was set to have an average current of 0.34 amps and a total current of 6.58 amps/minute. The remaining power source parameters were the same as in examples 1 and 4.

Each one of the INCONEL-601 pieces was masked and put into a suitable device for immersion into the plating bath. After pretreatment, the exposed surfaces (only the edges), were activated anodically and cathodically in an acid solution. After rinsing, the pieces were immersed in the nickel-cobalt-boron plating solution for 19 minutes, 22 seconds. The device containing the INCONEL-601 pieces was then removed from the bath, and the pieces of INCONEL-601 were washed with NaOH, rinsed with cold/hot water, and dried.

Figure 8:
FIG. 8 is an electron photomicrograph, enlarged 600X, of a coating of an alloy in accordance with Example 5 of the present invention on INCONEL-601, after treatment with alkali and acid etching.

The INCONEL-601 pieces were placed in a furnace for 90 minutes at 930° F. at one Torr of pressure in an argon atmosphere. After cooling, one piece was cut and prepared for metallurgical examination. X-ray examination revealed that the diffusion of the nickel-cobalt-boron alloy into the INCONEL-601 occurred at the interface (FIG. 8). SEM examination showed a composition of 55.05% $Ni_2B$ and 44.95% $Co_2B$. Atomic absorption showed the alloy had an elemental composition of 53.84% Ni, 43.97% Co, and 2.19% B at the outermost surface.

EXAMPLE 6: PLATING OF ALLOY ON TITANIUM

The procedures of Example 1 was followed to deposit the nickel-cobalt-boron alloy on a flat piece of commercial titanium, having an exposed surface of 1.5 cm×4 cm. The nickel-cobalt-boron bath of Example 1 was used. The power source was set to have an average current of 0.45 amps and a total current of 7.31 amps/minute.

The titanium substrate was pretreated but not activated to prevent the alloy from bonding to the substrate. The cathode was then immersed in the solution.

After 16 minutes, 15 seconds, the titanium cathode was removed from the plating bath, washed with a 10% NaOH solution, and rinsed with distilled water.

Using this process, two small pieces of nickel-cobalt-boron alloy foil, measuring 0.00125 cm in thickness, were obtained. The weight of one piece of the foil was determined to be 0.0654 g, resulting in a specific weight of 8.72 g/cm$^3$. This is very close to the alloy's theoretical density of 8.7432 g/cm$^3$.

Figure 9:
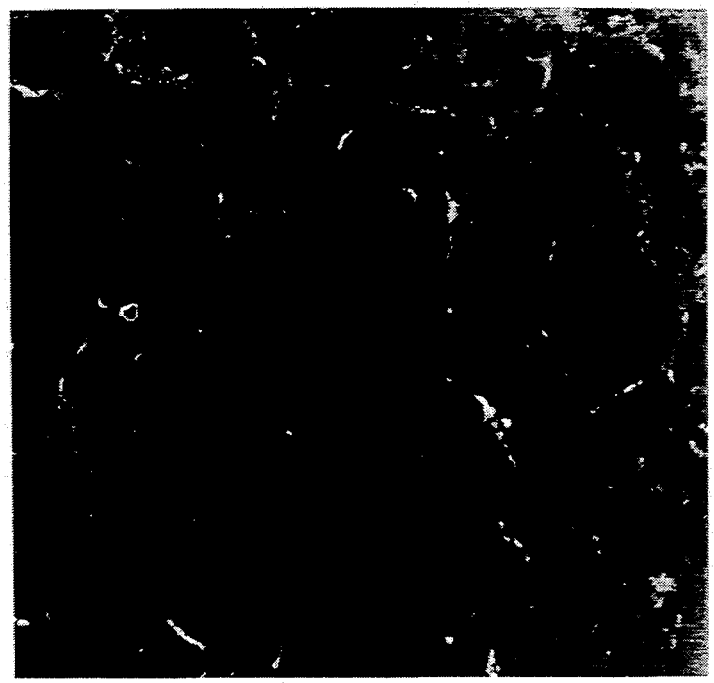
FIGS. 9 and 9A are photomicrographs enlarged 75x and 2000x respectively of Ni-Co-B foil after treatment with alkali made in accordance with example 6.
Figure 9A:

X-ray examination revealed no porosity or imperfection in the structure of the two pieces, despite their thinness. The two pieces were, however, found to reflect or mirror the surface configuration of the dummy substrate of titanium (FIGS. 9 and 9A).

SEM examination showed a composition on both sides to be 55.05% Ni$_2$B and 44.95% Co$_2$B.

The above examples are set forth for illustrative purposes only and are not to be construed as limiting.

EXAMPLE 7: MAGNETIC PROPERTIES OF THE Ni-CO-B ALLOY

To determine the magnetic properties of the nickel-cobalt-boron alloy, a sample of the alloy was connected to a Klipps Kelvin inductance meter. The meter used was supplied with two coils each having a length of 7.1 cm and a diameter of 1.7 cm. The coils each were 3.7 meters in length (for a combined wire length of 7.4 m) and each had 263 turns. The alloy samples tested had a length of 3.22 cm, a diameter of 0.90 cm, and a surface area of $2.897 \times 10^{-4}$ m$^2$ (2.897 cm$^2$).

The inductance $L_o$ was measured by connecting the two coils together and was found to be 23.95 H. When the alloy sample was connected between the coils the inductance L was 886.15 H. A current of 1.4 amps was used to determine both $L_o$ and L. This gave a constant of relative permeability ($K_M$) of 37 (i.e. $L/L_o$) and a magnetic susceptibility ($X_M$) of 36 (i.e., $K_M-1$). From these figures, the magnetic saturation (4piM$_s$), coercive force (H$_c$), coefficient of anisotropia (H$_a$), and the magnetic permeability of the alloy were calculated. The figures are shown below in Table I and compared with the figures for the Cobalt-Nickel-Iron alloys produced in Anderson et al, U.S. Pat. No. 4,661,216.

indicates that the alloy would act well as a thin film for a read head.

Coercivity (H$_c$) is the maximum magnetizing force at which the magnetic induction is zero when the material is in a symmetrically cyclically magnetized condition. It is also a measure of the alloy's ability to act as a read head. A low coercivity indicates that current can more easily pass through the crystals of the alloy. Thus, a material having a low coercivity will allow for faster reading of magnetic information from a disk, tape, or the like, because the current will be able to pass through the film more easily and hence more quickly.

Anisotropy (H$_a$) is a measure of the amount of change in the magnetic properties of a material in different directions in the material. It is also indicative of the ease, and hence the speed, with which current can pass through the alloy. A low value of anisotropy indicates the material is more uniform in its magnetic properties (i.e. it is isotropic). The current hence follows a less tortuous path through the alloy to allow for faster writing of information on the disk, tape, or other magnetic information device. The low measure of anisotropy indicates that the alloy is substantially isotropic and that the magnetic properties of the alloy remain substantially constant throughout the alloy.

Lastly, the magnetic permeability is indicative of the alloy's ability to maintain a magnetic field (i.e. act as a magnet). An alloy having a permeability of less than 1 is diamagnetic and must be in contact with a magnetic field to hold a magnetic charge. An alloy having a permeability of approximately 1 is a paramagnetic alloy which retains or holds a magnetic charge for a period of time, but which dissipates over time. An alloy having a permeability in excess of 1 is a ferromagnetic alloy and will take and maintain magnetism. For an alloy to operate as a magnetic recording device it needs to be ferromagnetic so that the information may be magnetically recorded thereon and then maintained. If the alloy is paramagnetic, the alloy will lose the information over time.

As can be seen from the figures, the Nickel-Cobalt-Boron alloy of the invention has a permeability of 1.332 and is thus ferromagnetic. It thus can take and maintain

TABLE I

| Prop. | Ni—Co—B | Co—Ni—Fe | Ni—Fe—Co$_1$ | Ni—Co—Fe$_2$ * |
|---|---|---|---|---|
| 4piM$_s$ (KG) | 20.136 | 16.00 | — | — |
| Hc(Oe) | 1.24 | 1.50 | 4.8 | 3.0 |
| Ha(Oe) | 3.74 | 10.0 | 4.0 | 8.0 |
| perm. (Gauss) | 1.332 | 1.00 | — | — |

* cobalt rich alloy

Magnetization of the alloy does not affect its dimensions. It thus as a magnetorestrictive coefficient of substantially zero. The alloy has a high magnetic saturation, a magnetorestrictive coefficient that is substantially zero, a low coercivity, and a low measure of anisotropy. These characteristics indicate the alloy is useful as a thin film for a read/write head. Further, high permeability indicates that the alloy has characteristics which are good for use as a magnetic information storage media, such as a computer disk, recording tape, CD, etc.

The measure of magnetic saturation (4piM$_s$) is an indication of the alloy's ability to be saturated in a magnetic field. The higher the magnetic saturation, the better the alloy's ability to act as a film for a read head. The measure of 20.136 of the alloy of this invention a magnetic charge and can be used as the coating for a magnetic recording media. The alloy also has good magnetic saturation, coercivity, and anisotropy, indicating that the alloy could also be used for a read/write head to magnetically write information to and read information from a magnetic recording media. The alloy could thus be used with a computer disk drive, a VCR, a tape recorder, etc.

EXAMPLE 8: THERMAL AND ELECTRICAL CONDUCTIVITY OF THE Ni-Co-B ALLOY

The alloy was next tested to determine its thermal and electrical conductivity. A Boekel 350 W V115 AC-DC calefactor with an integrated thermocouple and a temperature indicator was used to determine the alloy's thermal conductivity. To determine the thermal conductivity, an alloy sample was subjected to 130 W until it rose from a beginning temperature ($T_1$) of 48° C. to a final temperature ($T_2$) of 76° C. The sample had an original area of 6 cm$^2$. Over the duration of the test, the longitudinal length of the sample changed by 4 cm. The test indicated that the sample had a thermal conductivity ($C_t$) of 0.7394 Cal/cm·sec·°C. This value indicates that the alloy is not as good a conductor of heat as silver and copper, but can dissipate faster than aluminum.

To determine the electrical conductivity of the sample, the sample was connected to an HP 6439B DC-0-60V-25-A voltmeter with an IR compensator. The conductivity of the alloy applied to different substrates was also studied. In the first test, the alloy was plated over a carbon steel substrate to a thickness of 10 microns. The substrate was a cylinder having a diameter of 0.0086 m and a length of 0.0322 m. A current of 20 amps was applied to the sample at an ambient room temperature of 28° C. Voltage $V_1$ was 33.35 V and voltage $V_2$ was 33.49 V, for a voltage change, $V_d$ of 0.14 V. The length of the electric field, $D_x$, was determined to be 0.0322 m. This sample had a conductivity ($C_e$) of $6.8123 \times 10^7$ mhos/m, a conductance ($C_d$) of 142.8 mhos, a resistance (R) of $7 \times 10^{-3}$ ohms, and a resistivity ($R_s$) of $1.468 \times 10^{-8}$ ohm-m.

In the second sample, the alloy was plated over an aluminum substrate to a thickness of 70 microns. The substrate was a flat sheet with a length of 0.042 m, a thickness of 0.0016 m, and an are of $1.11 \times 10^{-7}$ m$^2$. A current of 19 amps was applied to the sample at a ambient temperature of 28° C. The initial voltage was 31.2838 V and the final voltage was 31.39 V, for a voltage change ($V_d$) of 0.11. The Length of the electric field was determined to be 0.042 m. This sample had a conductivity of $6.7619 \times 10^7$ mhos/m. a conductance of 178.92 mhos, a resistance of $5.589 \times 10^{-3}$ ohms, and a sensitivity of $1.479 \times 10^{-8}$ ohm-m.

In the third sample, the alloy was plated over a copper substrate to a thickness of 65 microns. The substrate was a cylinder with a diameter of 0.00642 m and a length of 0.1 m. A current of 21.6 amps was applied to the sample at a ambient temperature of 28° C. The initial voltage was 32.1874 V and the final voltage was 32.2830 V, for a voltage change ($V_d$) of 0.0957. The Length of the electric field was determined to be 0.1 m. This sample had a conductivity of $6.89 \times 10^7$ mhos/m, a conductance of 225.83 mhos, a resistance of $4.428 \times 10^{-3}$ ohms, and a sensitivity of $1.45 \times 10^{-8}$ ohm-m.

Tables IIA and IIB, below, compare the thermal conductivity, electrical conductivity, and resistance of the Ni-Co-B alloy of the present invention with other materials commonly used as conductors.

TABLE IIA

| Material | Thermal Conductivity Cal/cm s °C. |
|---|---|
| Silver | 1.000 |
| Pure Copper | 0.9400 |
| Aluminum | 0.5300 |
| Ni—Co—B | 0.7394 |

TABLE IIB

| Material | $C_e \times 10^{-7}$ Mho/m | $C_d$ mho | $R \times 10^3$ ohm | $R_2 \times 10^8$ ohm-m |
|---|---|---|---|---|
| Silver | 6.30 | 49.504 | 0.0202 | 1.587 |
| Copper | 5.85 | 46.082 | 0.0217 | 1.709 |
| Aluminum | 3.50 | 27.548 | 0.0363 | 2.857 |
| 10u Ni—Co—B on carbon steel | 6.8123 | 142.8 | 7 | 1.468 |
| 70u Ni—Co—B on Aluminum | 6.7619 | 178.92 | 5.589 | 1.479 |
| 65u Ni—Co—B on Copper | 6.89 | 225.83 | 4.428 | 1.45 |

The figures show that the Ni-Co-B alloy of the present invention is both a relatively poor conductor of heat and a good conductor of electricity. Further, the substrate upon which the alloy is coated does not appear to significantly influence the conductivity or resistivity of the alloy. These figures indicate that the Ni-Co-B alloy is a better conductor than silver. It may thus be used in place of silver or pure copper, for example, in the production of printed circuits. Because the cost of silver is significantly higher than the cost of the Ni-Co-B alloy of the present invention, the cost of printed circuit boards could be substantially reduced. When pure copper is used as a conductor, it builds up heat and the wires must be thermally protected. Gold is commonly plated over the copper to remove the heat carried by the copper. The gold must be separated from the copper or it will diffuse into the copper and it will not act as a thermal protector. A layer of nickel or cobalt must therefore be placed between the gold and copper to prevent the gold from diffusing into the copper. The use of copper conductors, therefore, requires two additional plating steps after the copper conductor has been deposited. Because the Ni-Co-B alloy does not readily conduct heat, the alloy does not need to be thermally protected. Thus the extra plating steps are not needed when Ni-Co-B is used as the conductor. The use of copper wires is thus much more expensive than the Ni-Co-B alloy.

The Ni-Co-B alloy of the invention may be used as a superconductor. When copper is used as a superconductor, it must be cooled with liquid helium. Because the Ni-Co-B alloy will not get as hot as copper, liquid nitrogen can be used to cool the alloy, rather than the more expensive and dangerous liquid helium. Because liquid nitrogen is much easier to produce and handle, the Ni-Co-B alloy would make a better superconductor than copper.

EXAMPLE 9: CATALYTIC EFFECTIVENESS OF Ni-Co-B

Figure 11:
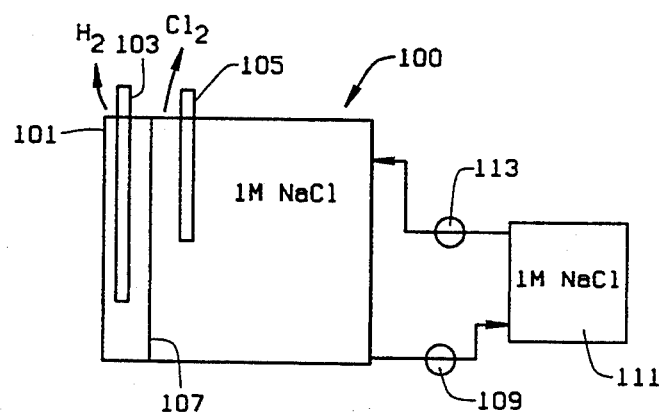
FIG. 11 is a diagram of a cell for the electrolytic production of a gas.

The Ni-Co-B alloy also operates extremely well as a catalyst for the production of gasses, such as hydrogen and halogens. To determine the catalytic activity and effectiveness of the Ni-Co-B alloy, the current exchange density ($I_0$ Amps/cm$^2$) of the alloy was measured during an electrolytic gas producing process. The experimental setup is diagramatically shown in FIG. 11. The electrolysis is carried out in a cell 100. Cell 100 included a tank 101 filled with an aqueous electrolytic solution. In one example a 1M NaCl solution was used to produce Cl$_2$ gas. A cathode 103 and an anode 105 are placed in the cell and are separated by a filter 107 which allows passage of ions, such as H$^+$, but is impervious to molecules Preferably both the anode and cathode are coated with the Ni-Co-B alloy of the invention. The reduction of NaCl, for example, in H$_2$O produces Cl$^-$, H$^+$, and NaOH. The NaOH is removed from the tank 101 by a pump 109 to a holding tank 111 containing a fresh supply of the electrolytic solution. Holding tank 111 is monitored to keep the electrolytic solution at the desired conditions, in the example, 1M NaCl. The fresh electrolytic solution is then pumped back into the main tank 101.

EXAMPLE 10: PRODUCTION OF HYDROGEN

Figure 12:
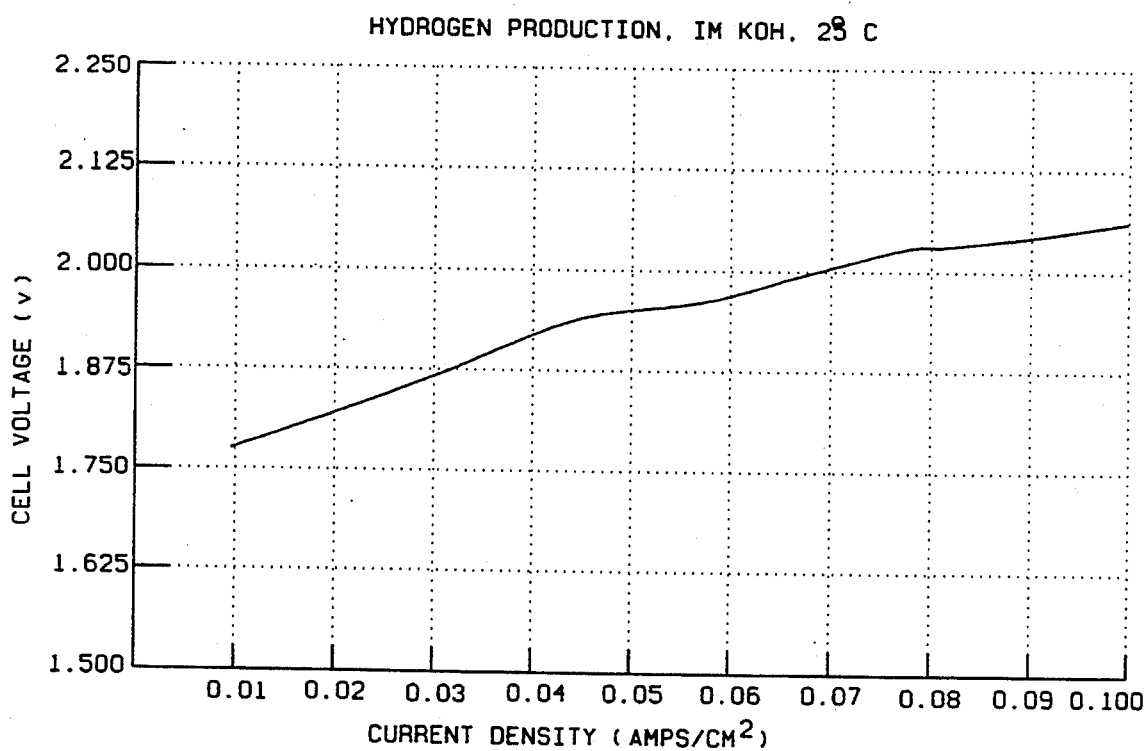
FIG. 12 shows the plot of current density vs. cell voltage for the production of hydrogen gas using 1M KOH at 25° C.

Hydrogen was produced using a 1M KOH solution. The surface area of the anode used was 85% of the surface area of the cathode. The catalytic effectiveness was tested by altering the amperage, and hence the current density, and measuring the voltage at the cathode and the voltage at the anode to determine the cell voltages. Table III below shows the voltages measured at the anode and cathode for the cell at varying amperages. FIG. 12 plots the current density against the cell voltage. As can be seen from FIG. 12, the slope of the curve is shallow, about 3.3 V cm$^2$/Amp. This allows for a broad range of amperages to be used without increasing the voltage too much.

TABLE III

| DETERMINATION OF CELL VOLTAGE | | | |
|---|---|---|---|
| Current Density (Amps/cm$^2$) | Cathode (V) | Anode (V) | Cell Voltage (V) |
| 0.010 | 1.362 | 0.388 | 1.750 |
| 0.020 | 1.375 | 0.413 | 1.788 |
| 0.030 | 1.415 | 0.432 | 1.835 |
| 0.040 | 1.448 | 0.446 | 1.894 |
| 0.050 | 1.475 | 0.460 | 1.935 |
| 0.060 | 1.480 | 0.467 | 1.947 |
| 0.065 | 1.490 | 0.476 | 1.966 |
| 0.070 | 1.505 | 0.480 | 1.985 |
| 0.075 | 1.510 | 0.490 | 2.000 |
| 0.080 | 1.520 | 0.496 | 2.016 |
| 0.090 | 1.530 | 0.500 | 2.030 |
| 0.100 | 1.536 | 0.510 | 2.046 |

EXAMPLE 11: PRODUCTION OF HYDROGEN

Figure 13:
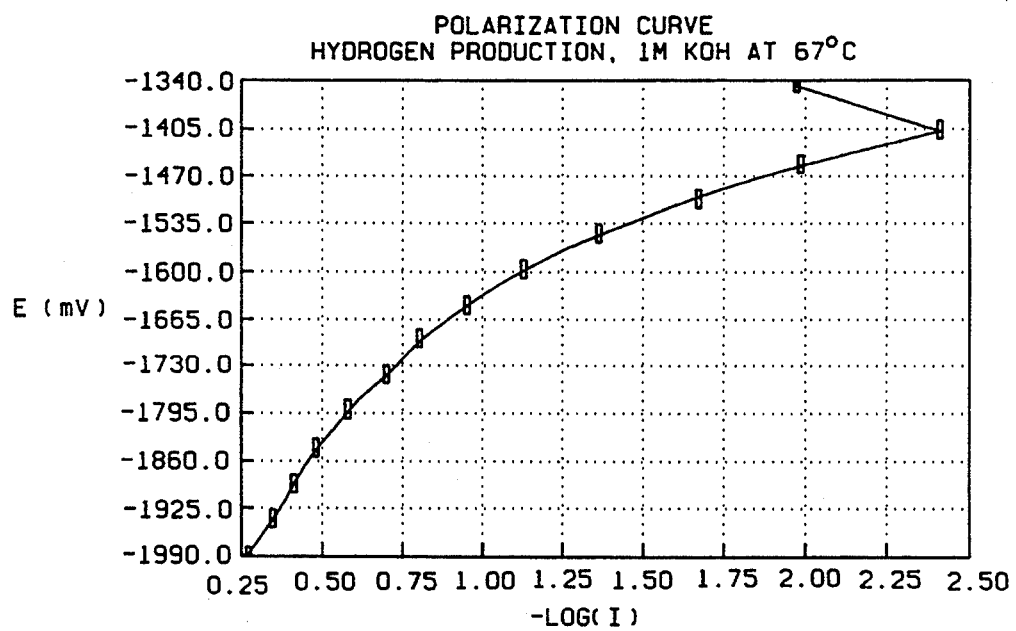
FIG. 13 shows the polarization curve for the production of hydrogen gas using 1M KOH at 67° C.
Figure 14:
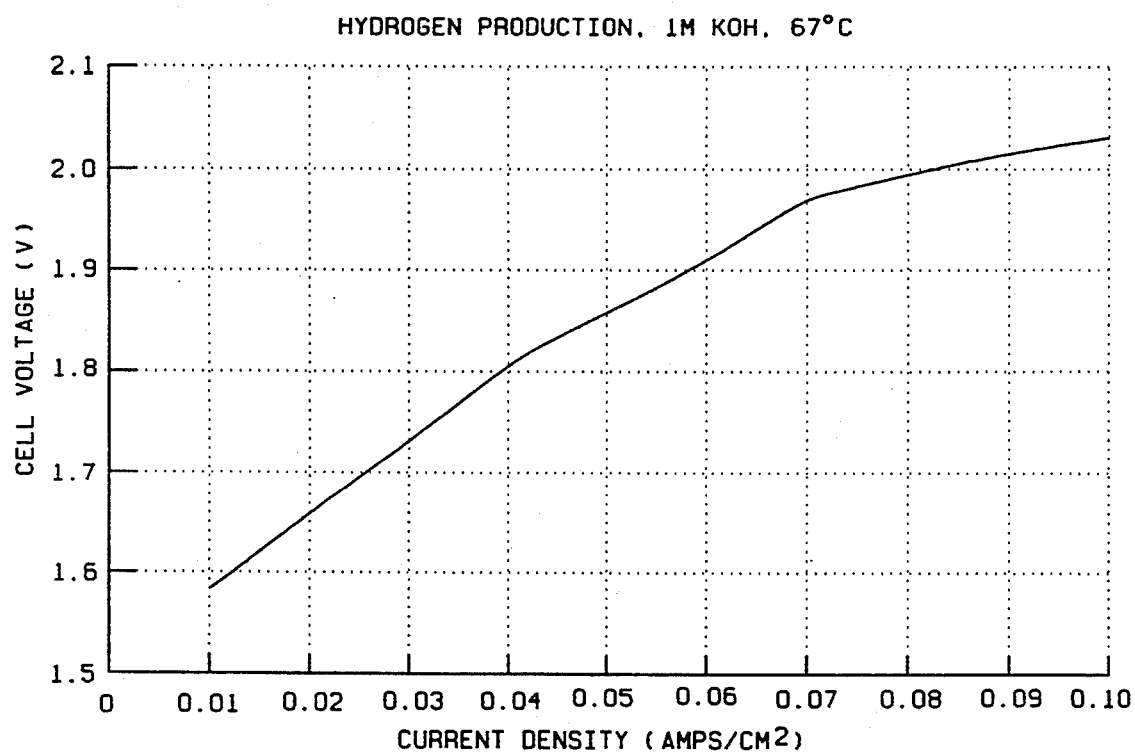
FIG. 14 shows the plot of current density vs. cell voltage for the production of hydrogen gas using 1M KOH at 67° C.

Hydrogen was again electrolytically produced using a 1M KOH solution at 67° C. Table IV below shows the change in polarization for changing voltages. Table V shows the cell voltage for different current densities. The results of Tables IV and V are plotted in FIGS. 13 and 14. FIG. 14, again, shows that the use of the alloy as a catalyst produces a shallow slope, here about 8 V·cm$^2$/Amp. This shows that the alloy allows for the use of a broad range of amperages before the cell voltage gets too high and damages the system.

TABLE IV

| TRANSFER OF ENERGY DENSITY OF CURRENT EXCHANGE | | |
|---|---|---|
| E (mV) | I (Amp/cm$^2$) | −Log(I) |
| −1340 | 0.0100 | 2.00 |
| −1390 | 0.0035 | 2.45 |
| −1440 | 0.0095 | 2.02 |
| −1490 | 0.0200 | 1.70 |
| −1540 | 0.0417 | 1.38 |
| −1590 | 0.0724 | 1.14 |
| −1640 | 0.1096 | 0.96 |
| −1690 | 0.1549 | 0.81 |
| −1740 | 0.1995 | 0.70 |
| −1790 | 0.2630 | 0.58 |
| −1840 | 0.3311 | 0.48 |
| −1890 | 0.3890 | 0.41 |
| −1940 | 0.4467 | 0.35 |
| −1990 | 0.5370 | 0.27 |

TABLE V

| DETERMINATION OF CELL VOLTAGE | |
|---|---|
| CURRENT DENSITY (A/cm$^2$) | CELL VOLTAGE (V) |
| 0.010 | 1.582 |
| 0.020 | 1.664 |
| 0.030 | 1.749 |
| 0.040 | 1.822 |
| 0.050 | 1.876 |
| 0.060 | 1.925 |
| 0.070 | 1.987 |
| 0.080 | 2.011 |
| 0.090 | 2.032 |
| 0.100 | 2.049 |

The results show that when the Ni-Co-B alloy is used as a catalyst for electrolytic production of hydrogen, the voltage ranges between 1.582–1.876 V for a current density of between 0.010 and 0.050 Amp/cm$^2$. For one cubic meter of gas, this translates to an energy requirement of 3.78 to 4.48 KWHr. Electroless nickel, on the other hand, uses 2.200 V to 2.385 V and a current density of 0.0177–0.0323 and requires between 5.26 and 5.70 KWHr for the same gas production. As can be seen, the use of the Ni-Co-B alloy of the present invention drastically reduces the energy consumption and has a much broader range of current densities which can be used to produce gasses. (0.294 for the Ni-Co-B alloy versus 0.015 for the electroless nickel.) Table VI below compares the catalytic capacity of the Ni-Co-B alloy in the production of hydrogen gas from KOH against cobalt and nickel, two common catalysts used for the production of hydrogen. The lower absolute value of —LOG-($I_0$) indicates that the Ni-Co-B alloy is a better catalyst than either cobalt or nickel.

TABLE VI

| COMPARATIVE DENSITY OF CURRENT EXCHANGE CATALYTIC CAPACITY | | |
|---|---|---|
| Catalyst | −Log($I_0$) | $I_0$ (amps/cm$^2$) |
| Ni—Co—B | 1.500 | 3.16 × 10$^{-2}$ |
| Cobalt | 1.870 | 1.34 × 10$^{-2}$ |
| Nickel | 3.340 | 4.50 × 10$^{-4}$ |

EXAMPLE 12

Figure 15:
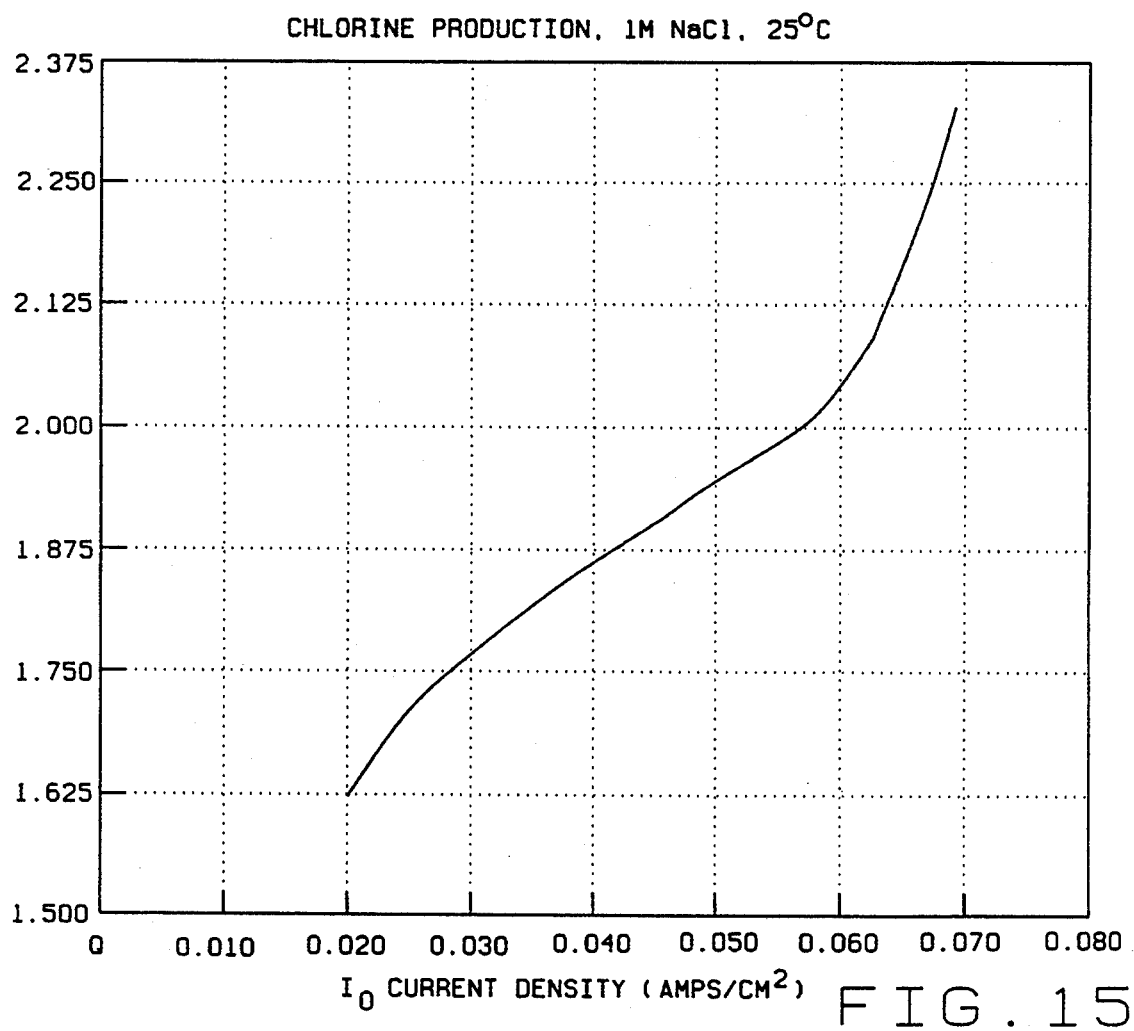
FIG. 15 shows the plot of current density vs. cell voltage for the production of chlorine gas using 1M NaCl at 25° C.

Tables VII below shows the current densities and cell voltages obtained during the production of chlorine gas using 1M NaCl at 25° C. The results are graphed in FIG. 15. As can be seen, the voltage has a near steady rate of increase of 8.86 V cm$^2$/amp between current densities of 0.025 and 0.060. Acceptable current densities can be as low as 0.020 amp/cm$^2$. After a current density of 0.060, the voltage increase becomes too steep, as shown in the graph, indicating that more power would be needed to produce the chlorine gas. Acceptable densities are between 0.020 and 0.060. Current densities of between 0.025 and 0.050 are preferred and a current density of about 0.045 is optimal.

TABLE VII

| DETERMINATION OF CELL VOLTAGE | |
|---|---|
| CURRENT DENSITY (Amps/cm$^2$) | CELL VOLTAGE (V) |
| 0.020 | 1.624 |
| 0.025 | 1.725 |
| 0.030 | 1.775 |
| 0.035 | 1.815 |
| 0.040 | 1.860 |
| 0.045 | 1.900 |

TABLE VII-continued

| DETERMINATION OF CELL VOLTAGE | |
|---|---|
| CURRENT DENSITY (Amps/cm$^2$) | CELL VOLTAGE (V) |
| 0.050 | 1.945 |
| 0.055 | 1.985 |
| 0.060 | 2.035 |
| 0.065 | 2.128 |
| 0.070 | 2.326 |

Table VIII shows the current density and voltage ranges acceptable and compares them with the use of carbon steel and mercury as catalysts in the production of chlorine gas.

TABLE VIII

COMPARATIVE CELL VOLTAGE AND ENERGY CONSUMPTION

| ANODE | CURRENT DENSITY | VOLTAGE | ENERGY CONSUMPTION (KWHr) |
|---|---|---|---|
| Ni—Co—B | | | |
| min | 0.020 | 1.624 | 7.89 |
| max | 0.060 | 2.035 | 9.89 |
| Carbon steel | 0.132 | 4.500 | 21.89 |
| Mercury | | | |
| min | — | 3.900 | — |
| max | — | 4.500 | — |

These tables show that the Ni-Co-B alloy of the present invention requires a much lower current and voltage, and hence consumes less energy to produce chlorine gas than either carbon steel or mercury, which are commonly used to produce chlorine gas electrolytically. Although the energy consumption of chlorine gas production using mercury is not shown, the fact that the use of a mercury catalyst requires two concurrent electrolytic processes, as set forth in the background, indicates that the Ni-Co-B alloy system would use much less energy than a mercury system. The Ni-Co-B system requires only one electrolytic process compared to the two processes needed when mercury is used.

EXAMPLE 13

Figure 16:
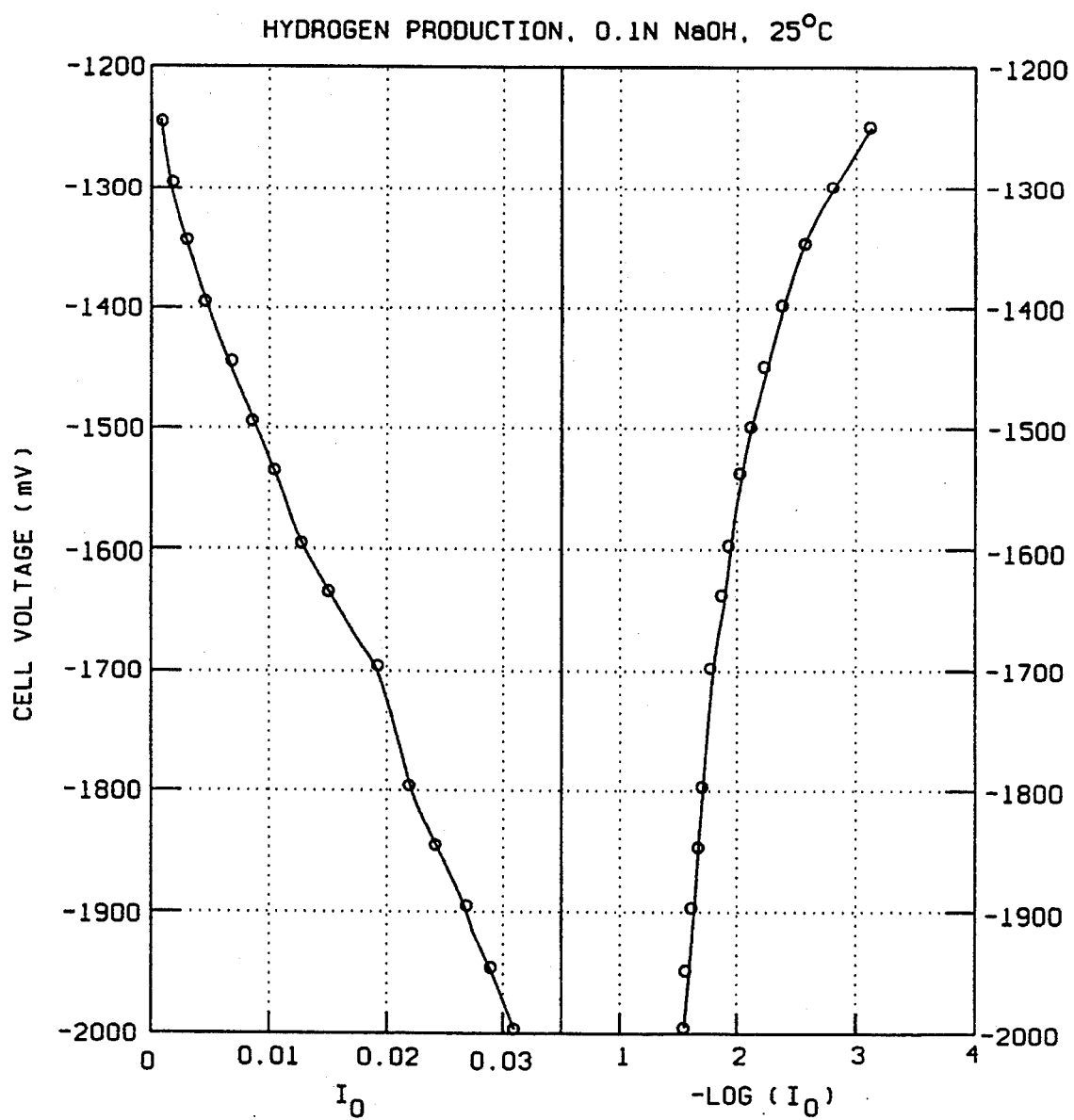
FIG. 16 shows the polarization curve for the production of hydrogen gas using 0.1N NaOH at 25° C.
Figure 18:
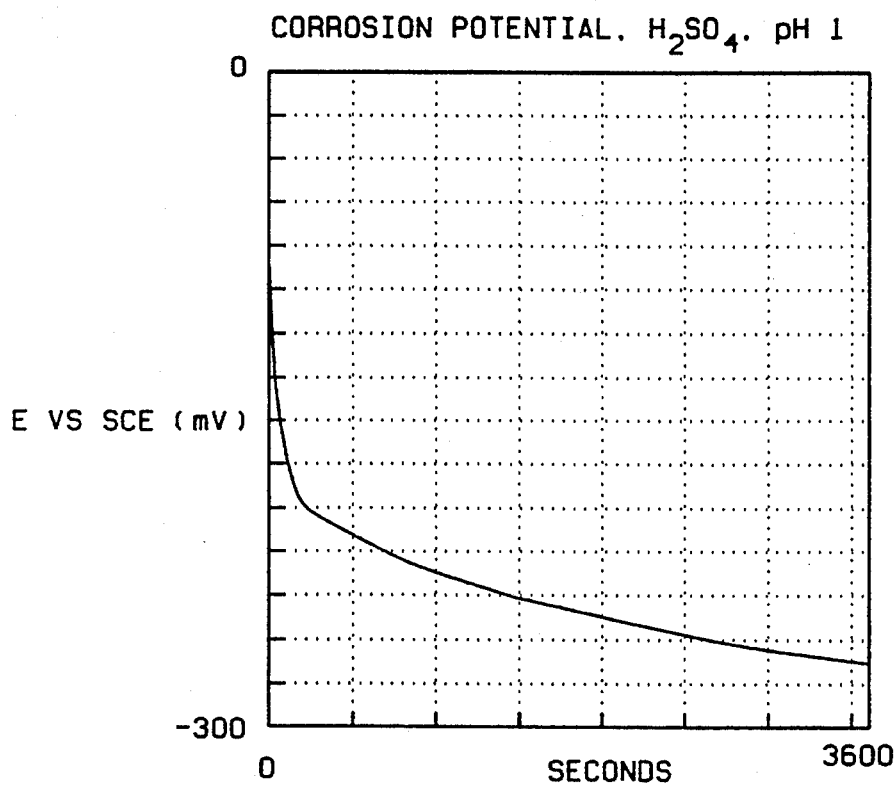
FIGS. 18–23 show corrosion potential curves for a Ni-Co-B plated substrate is various acidic electrolytic solutions.
Figure 19:
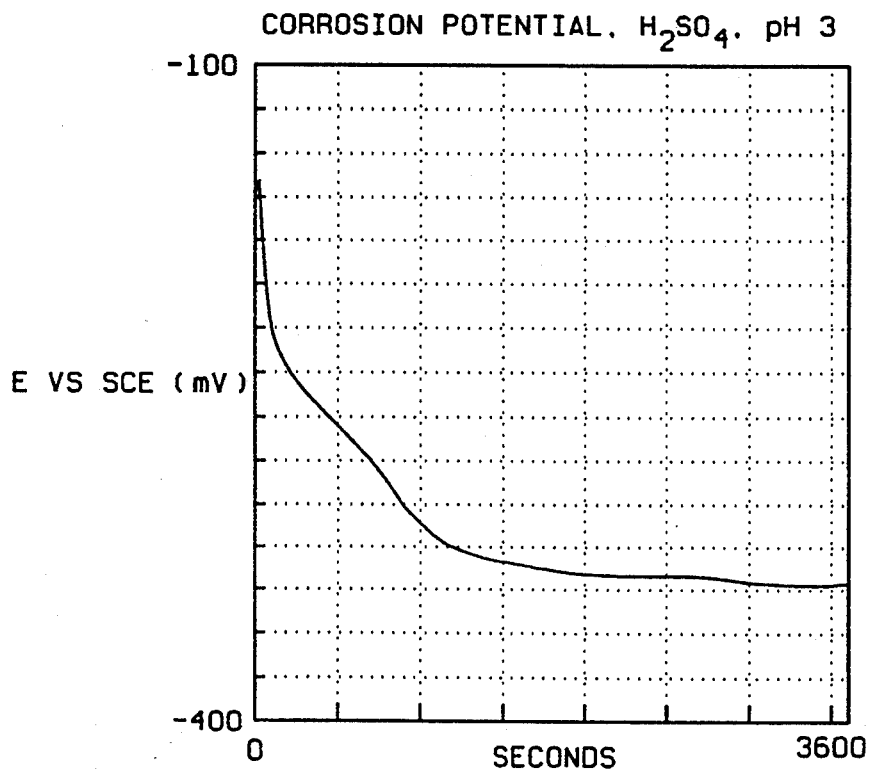
Figure 20:
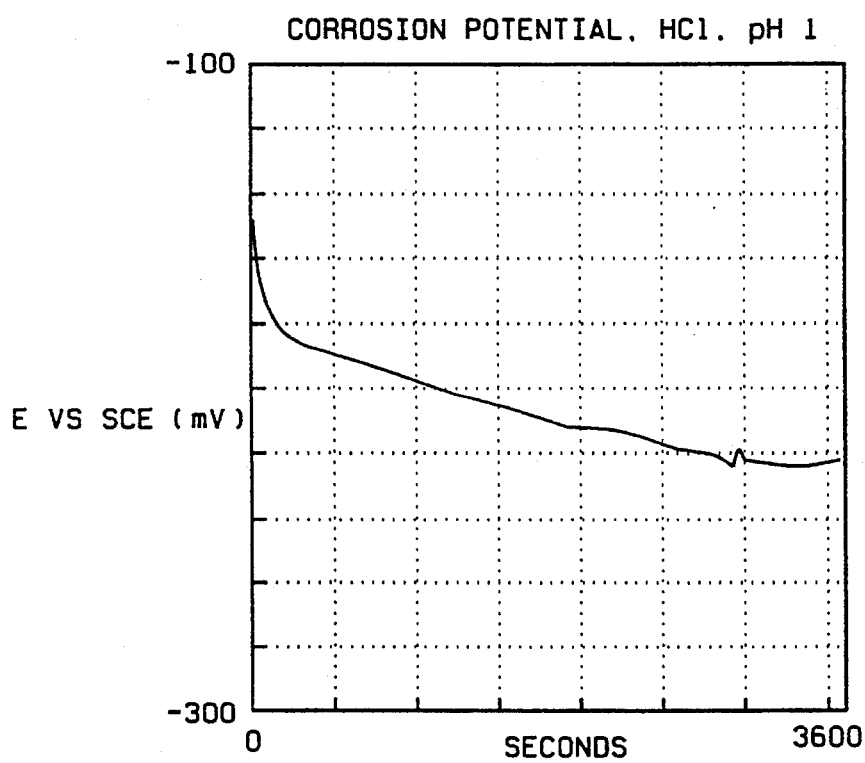
Figure 21:
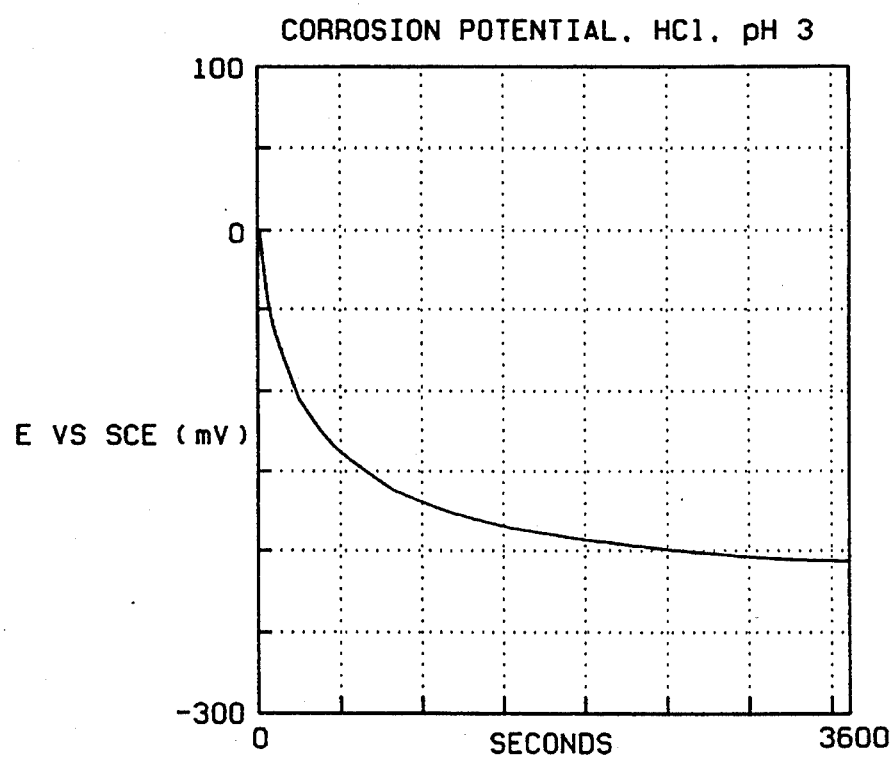
Figure 22:
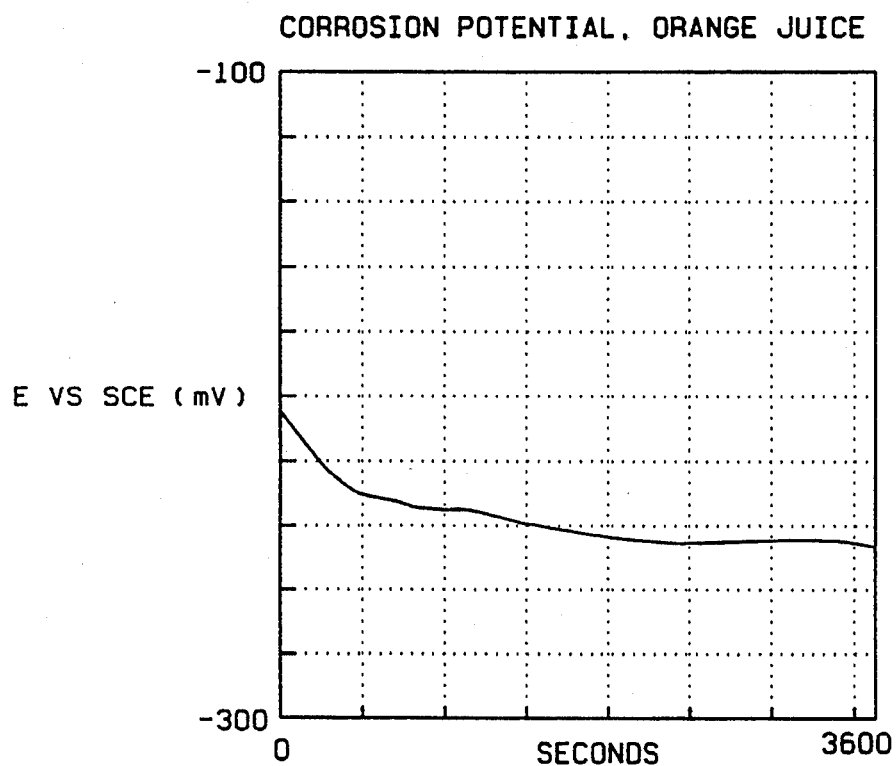
Figure 23:
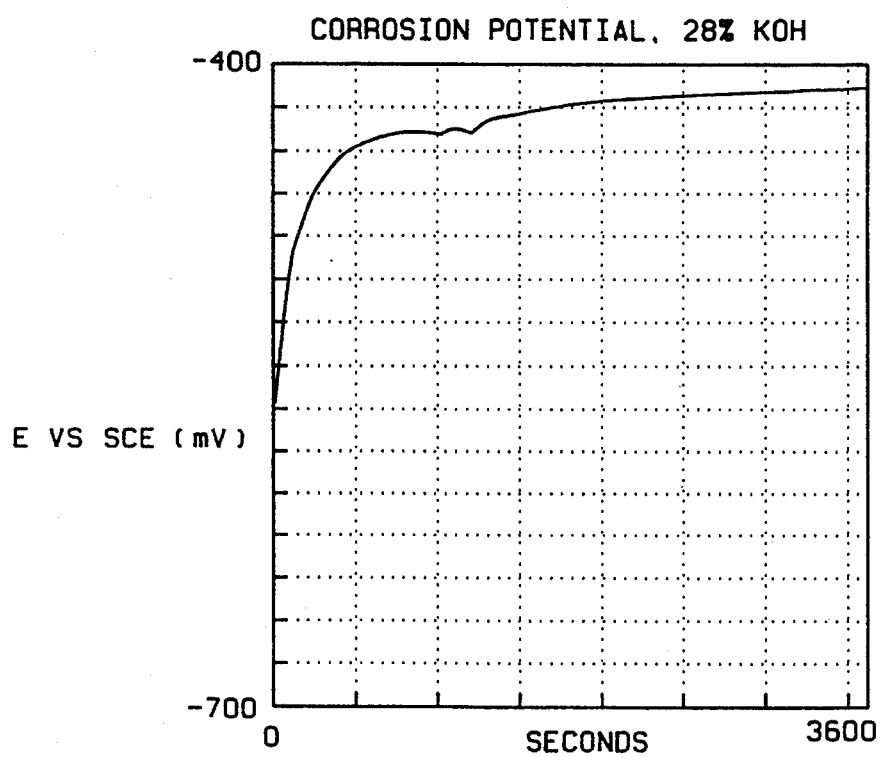

Hydrogen was produced using a 0.1N NaOH solution at 25° C. Table IX shows the polarization curve for different applied voltages. The polarization curve is shown in FIG. 16.

TABLE IX

TRANSFER OF ENERGY DENSITY OF CURRENT EXCHANGE

| E (mV) | I (Amp/cm$^2$) | —Log(I) |
|---|---|---|
| —1240 | 0.0010 | 3.02 |
| —1290 | 0.0019 | 2.72 |
| —1340 | 0.0032 | 2.50 |
| —1390 | 0.0049 | 2.31 |
| —1440 | 0.0068 | 2.17 |
| —1490 | 0.0087 | 2.06 |
| —1530 | 0.0105 | 1.98 |
| —1590 | 0.0129 | 1.89 |
| —1630 | 0.0151 | 1.82 |
| —1690 | 0.0191 | 1.72 |
| —1790 | 0.0219 | 1.66 |
| —1840 | 0.0240 | 1.62 |
| —1890 | 0.0269 | 1.57 |
| —1940 | 0.0288 | 1.54 |
| —1990 | 0.0309 | 1.51 |

Table X compares the current density of the Ni-Co-B alloy of the invention against iridium, platinum, palladium, and nickel. As can be seen, the Ni-Co-B alloy has a much lower current density than the other catalysts. It thus out performs all these catalysts, as has been shown above by comparing the energy consumption needed to produce gasses with different alloys.

TABLE X

COMPARATIVE CATALYTIC CAPACITY

| METAL | —Log I$_0$ | I$_0$ |
|---|---|---|
| Ni—Co—B | 2.793 | $1.61 \times 10^{-3}$ |
| Iridium | 3.260 | $5.49 \times 10^{-4}$ |
| Platinum | 3.400 | $3.98 \times 10^{-4}$ |
| Palladium | 3.600 | $2.51 \times 10^{-4}$ |
| Nickel | 6.400 | $3.98 \times 10^{-7}$ |

EXAMPLE 14

Figure 17:
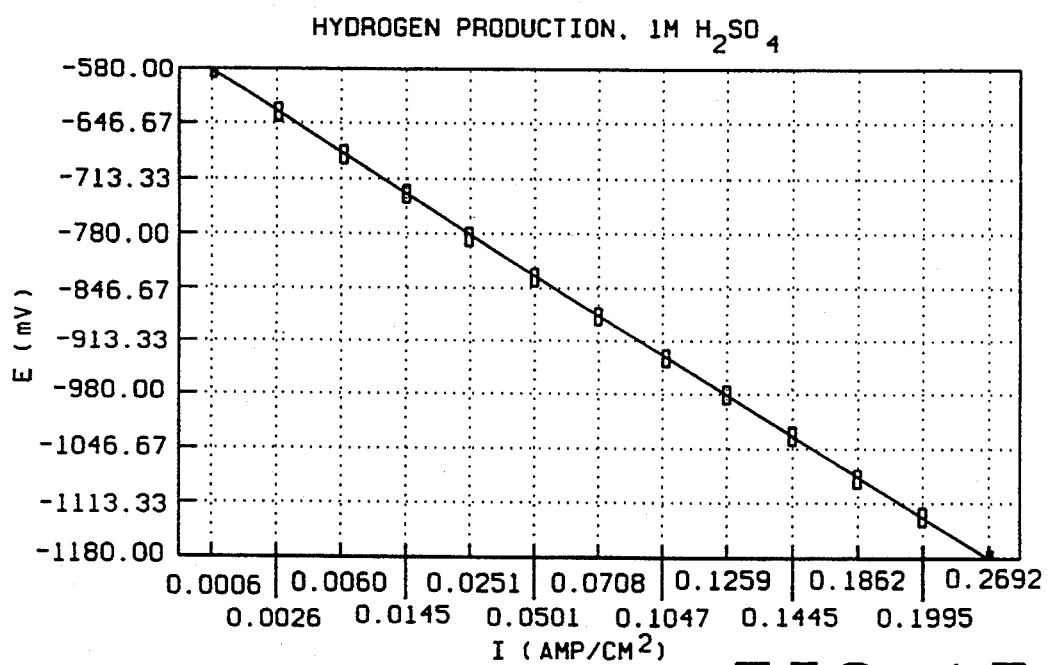
FIG. 17 shows the polarization curve for the production of hydrogen gas using 1M $H_2SO_4$ at 25° C.

Hydrogen was produced using a 1M H$_2$SO$_4$ solution at 25° C. Table XI shows the polarization curve for different applied voltages. The polarization curve is shown in FIG. 17. Again, the alloy provides for a shallow slope (about 2.2 V cm$^2$/Amp), as seen in FIG. 17.

TABLE XI

DENSITY OF CURRENT EXCHANGE

| E (mV) | I (Amp/cm$^2$) | —Log(I) |
|---|---|---|
| —580 | 0.0006 | 3.23 |
| —630 | 0.0026 | 2.58 |
| —680 | 0.0060 | 2.22 |
| —730 | 0.0145 | 1.84 |
| —780 | 0.0251 | 1.60 |
| —830 | 0.0501 | 1.30 |
| —880 | 0.0708 | 1.15 |
| —930 | 0.1047 | 0.98 |
| —980 | 0.1259 | 0.90 |
| —1030 | 0.1445 | 0.84 |
| —1080 | 0.1862 | 0.73 |
| —1130 | 0.1995 | 0.70 |
| —1180 | 0.2692 | 0.57 |

Table XII compares the current density of the Ni-Co-B alloy of the invention against palladium, platinum, rhodium, iridium, and nickel. As can be seen, the Ni-Co-B alloy has a much higher current density (I$_0$), and a much lower —Log(I$_0$), than the other catalysts. It thus out-performs all these catalyst, as has been shown above by comparing the energy consumption needed to produce gasses with different alloys.

TABLE XII

COMPARATIVE CATALYTIC CAPACITY

| METAL | —Log(I$_0$) | I$_0$ |
|---|---|---|
| Ni—Co—B | 2.860 | $1.38 \times 10^{-3}$ |
| Palladium | 3.000 | $1.00 \times 10^{-3}$ |
| Platinum | 3.100 | $8.00 \times 10^{-4}$ |
| Rhodium | 3.600 | $2.50 \times 10^{-4}$ |
| Iridium | 3.700 | $1.90 \times 10^{-4}$ |
| Nickel | 5.200 | $6.30 \times 10^{-6}$ |

EXAMPLE 15

Hydrogen was produced using a 28% (1 molar) solution of KOH at 22° C. at ambient pressures. The hydrogen produced was collected so that the amount of hydrogen produced could be measured and weighed. The same procedure was carried out three times. In each run, the cathode had an area of 4 cm$^2$ and the anode had an area of 3.4 cm$^2$. Both the cathode and anode were flat.

In the first run, the cathode and anode (both made of carbon steel) were both plated with the Ni-Co-B alloy of the present invention and had thicknesses of 25.4 microns. With a current density of 0.1125 amps/cm$^2$, 0.450 amps were applied The cell voltage was 2.090 V and the energy used was 28.215 W. In 1800 seconds, 0.020030 g of H$_2$ was produced, for a production rate of 0.000668 gm H$_2$/min. Faraday's law gives a theoretical yield of 0.00846 g H$_2$ under these conditions. The use of the alloy thus appears to have increased production by 136% above the theoretical yield.

In the second run, the same cathode and anode were used. The current density, however was raised to 0.225 Amps/cm$^2$. 0.900 Amps were applied, resulting in a cell voltage of 2.520 V. In 1800 seconds, 68.4 W of energy was used and 0.025632 gm of H$_2$ was produced, for a production rate of 0.000854 gm H$_2$/min. By doubling the current density, hydrogen production was increased by about 28% and energy consumption increased by about 142%. Here, Faraday's law gives a theoretical yield of 0.0169 g H$_2$. Hydrogen production was thus 51.5% above the theoretical yield.

In the third run, the same cathode and anode were used. The current density, however was raised to 0.4325 Amps/cm$^2$. 1.730 Amps were applied, resulting in a cell voltage of 2.595 V. In 1800 seconds, 134.73 W of energy was used and 0.045621 gm of H$_2$ was produced, for a production rate of 0.00152 gm H$_2$/min. Here, Faraday's law gives a theoretical yield of 0.0323 g H$_2$. Hydrogen production was thus 43.75% above the theoretical yield.

In the fourth run, the cathode was carbon-steel and the anode was plated with electroless Nickel. The cathode and anode were flat and had the same area, but had a thickness of about 34 microns. The test was run for 1292 seconds. A current density of 0.1125 amps/cm$^2$ was used, for a total of 0.450 amps applied. The cell voltage was 2.43 V and the energy consumed was 23.55 W. In the 1292 seconds, 0.005702 gm H$_2$ was produced, for a production rate of 0.000265 gm H$_2$/min. Faraday's law gives a theoretical yield of 0.006 g H$_2$. Here, the yield was only 95% of the theoretical yield which is the same as −5% of the theoretical yield.

Table XIIIA below tabulates the results from the above tests.

TABLE XIIIA

HYDROGEN PRODUCTION USING Ni—Co—B VS. THEORETICAL YIELD

| Run No. | Current Density | Amps | Cell Volt | Time sec | Watts used | H$_2$ prod | H$_2$ theo | Eff. % |
|---|---|---|---|---|---|---|---|---|
| 1 | 0.1125 | 0.450 | 2.090 | 1800 | 28.215 | .020 | 0.008 | 136 |
| 2 | 0.2250 | 0.900 | 2.520 | 1800 | 68.04 | 0.026 | 0.017 | 51 |
| 3 | 0.4325 | 1.730 | 2.595 | 1800 | 134.73 | 0.046 | 0.032 | 44 |
| 4 | 0.1125 | 0.450 | 2.430 | 1292 | 23.55 | 0.0057 | 0.006 | −5 |

Table XIIIB below compares the purity of the Hydrogen produced using the Ni-Co-B alloy and electroless Nickel.

TABLE XIII

PURITY OF HYDROGEN PRODUCED WITH NI—CO—B AND ELECTROLESS NICKEL

| Impurity (ppm) | Ni—Co—B | electroless Nickel |
|---|---|---|
| H$_2$O | 4 | 8 |
| O$_2$ | 3 | 10 |
| N$_2$ | 11 | 16 |
| CH | 0 | 4 |
| Purity | 99.988% | 99.96% |

As can be seen, the hydrogen produced using the Ni-Co-B alloy is purer than that produced using electroless nickel. Further, the hydrogen was produced at a faster rate (about 2.5 times faster) and using less energy (0.94 W/min for Ni-Co-B v. 1.09 W/min for electroless Ni) than when electroless nickel was used.

EXAMPLE 16: RESISTANCE TO CORROSION

The Ni-Co-B alloy of the invention has been found to be highly resistant to corrosion. Both gravimetric tests and electrochemical tests were performed to study the corrosive behavior and corrosive velocity of the alloy.

The gravimetric tests were performed by submerging a piece of stainless steel coated with the Ni-Co-B alloy in different electrolytic solutions for a predetermined amount of time. The corrosion velocity was determined by the loss of weight during the test. The procedure followed was reported in "Laboratory Corrosion Testing of Metals for the Process Industries." NACE TM/0169-76.

The electrochemical tests were performed by determining the variation of the corrosion potential with time and the measurement of the instantaneous corrosion obtained by a Tafel's extrapolation technique. The electrochemical behavior is thus shown by the polarization potentiostatic curves of FIGS. 18-23. A potentiostatic/galvanostatic PAR connected to a computer was used in the performance of the electrochemical tests. The test assembly included three electrodes—1) a piece of Ni-Co-B coated stainless steel (the working electrode), 2) a piece of thermoregulated saturated calomel (the reference electrode), and 3) two graphite bars of electroscopic purity. The graphite bars were placed symmetrically around the working electrode to homogenize the electrical field in the interior of the electrolytic cell. The cell consisted of a 500 ml glass ball with five openings.

The electrolytic solutions used were H$_2$SO$_4$ with a pH of 1 and 3, HCl with a pH of 1 and 3, 28% KOH, and orange juice with a pH of approximately 3. The solutions were all of analytic quality, except for the orange juice, which was commercial brand. Dilutions were prepared using bidistilled water. The test pieces had a nominal coating thickness of 25 microns. A test was also performed in a simulated marine atmosphere. A 3% NaCl solution and 100% humidity were used to simulate a marine atmosphere. The test pieces were used as deposited. The pieces underwent no treatment after the coating process was complete. The test pieces for the electrochemical study were circular pieces with an approximate diameter of 1.3 cm. The test pieces used for the gravimetric study were rectangular with a superficial area of between 3.25 and 4 cm$^2$. The substrate used was stainless steel, type 304 and 316. Table XIV below shows the loss of material, in meters per year, for the different solutions by both the gravimetric and electrochemical procedures.

TABLE XIV

| | H$_2$SO$_4$ pH 1 | H$_2$SO$_4$ pH 3 | HCL pH 1 | HCL pH 3 | 28% KOH | Orange Juice pH 3 |
|---|---|---|---|---|---|---|
| grav. | 0.00378 | 0.0018 | 0.0255 | 0.0073 | 0.000468 | 0.00356 |
| electro-chem. | 3.07 | 2.47 | 1.01 | 0.984 | 0.83 | 0.232 |

The fact that the gravimetric values are substantially smaller than the electrochemical values indicates that the alloy forms a protective film. The gravimetric tests lasted much longer than the electrochemical tests, and thus, this film was not formed during the electrochemical tests. This conclusion is further borne out by the corrosion potential curves of FIGS. 18–23. In each case, the potential went through a steep curve until a stabilization was reached. Stabilization was reached more quickly in the more acidic solutions (pH=1) than in the less acidic solutions (pH=3). This stabilization would be characteristic of the formation of a protective film over the alloy.

Table XV below compares the corrosion velocity, in meters per year, of the Ni-Co-B alloy against values obtained from the corrosion data survey of the National Association of Corrosion Engineers (NACE). The table shows that the Ni-Co-B alloy can withstand corrosive environments much better than any of the metals it was compared against,

TABLE XV

| Metal | $H_2SO_4$ pH 1 & 3 | HCl pH 1 & 3 | 28% KOH | Orange juice |
|---|---|---|---|---|
| Stainless Steel 304 | greater than 50 | greater than 50 | less than 20 | 4.333 |
| Stainless Steel 316 | greater than 50 | greater than 50 | less than 20 | 4.33 |
| Fe—Ni—Cr | greater than 50 | greater than 50 | less than 20 | — |
| Platinum | — | — | less than 2 | — |
| Nickel | 20–50 | greater than 50 | less than 20 | — |
| Ni—Co—B | 0.00378 0.00180 | 0.0255 0.0073 | 0.000468 | 0.00356 |
| Ni—Co—B electrochem. | 3.0700 2.4700 | 1.010 0.984 | 0.83 | 0.2320 |

The alloy was also tested under a simulated marine environment. The test was conducted by placing a test piece in a cell containing a 3% NaCl solution at 100% humidity for 1032 hours (43 days). Both visual inspection and inspection under a stereographic microscope showed no corrosion. The test pieces remained brilliant.

It was also tested by placing a drop of 3% NaCl solution on a test piece and leaving it there for 832 hours (approximately 35 days). An opaque spot formed where the NaCl was placed. This spot showed an iridescent color when exposed to light. The spot may be due to the formation of an oxide; however, the test pieces did not corrode. This was shown by the fact that they weighed the same after the test as before.

Tests were also run which simulated the operating conditions of an electrolytic process for the production of hydrogen. A working electrode plated with the Ni-Co-B alloy, an auxiliary electrode of pure graphite, and a reference electrode of saturated calomel were placed in a 28% KOH solution. Growing cathodic voltages were applied from the repose potential until hydrogen was discharged. At hydrogen discharge, the voltage was 1800 mV with a current density of 5.997 mA/cm$^2$, as measured at the reference electrode. Visual and microscope examination revealed negligible damage to the alloy. This is far superior to conventional electrodes of nickel-plated steel which, under similar testing, show deterioration due to the discharge of hydrogen. Because of the deterioration of the nickel-plated steel electrode, an electrode plated with the Ni-Co-B alloy will have a considerably longer operating life than the nickel plated steel electrode.

EXAMPLE 17: MECHANICAL PROPERTIES OF Ni-Co-B ALLOY

The mechanical properties of the alloy were determined through the tension, deformation and wear curves of the alloy as deposited and without lubrication.

The tension/deformation was tested first. The test pieces used to test deformation had a diameter of about 0.5 inches and a length of 2 inches. To test the deformation, the test piece was placed in a device which would stretch it. A extensometer was attached to the test piece to determine the extension or deformation of the test piece for various forces. The stress and deformation were calculated according to the following equations:

Stress = $Q = F/A_O$ where $F$ = applied force and $A_O$ = transverse sectional area Deformation = $E = (L - L_O)/L_O$ The results of the tension test are shown in Table XVI. The table also shows the theoretical tension and deformation which is plotted on the deformation curve of FIG. 24.

TABLE XVI

| FORCE (lb) | TENSION s (lb/cm$^2$) | DEFORMATION Ex 10$^4$ | LENGTH L (in.) |
|---|---|---|---|
| Ni—Co—B Alloy | | | |
| 1000 | 5100 | 0 | 2.0 (L$_O$) |
| 14000 | 71100 | 16 | 2.0032 |
| 18000 | 90000 | 23.5 | 2.0047 |
| 18900 | 96000 | 41.0 | 2.0082 |
| 22000 | 112000–153631* | 980–935* | 2.196 |
| 17000 | 86000–176000* | 2040–1410* | 2.408 |
| Substrate | | | |
| 500 | 2500 | 0 | 2.0 |
| 11000 | 55000 | 18.0 | 2.0036 |
| 13000 | 65000 | 25.5 | 2.0051 |
| 14000 | 70000 | 36.5 | 2.0073 |
| 14500 | 73500 | 44.0 | 2.0088 |
| 16000 | 81000 | 200.0 | 2.040 |
| 14200 | 71500 | 485.0 | 2.098 |

*Real Results

Figure 24:
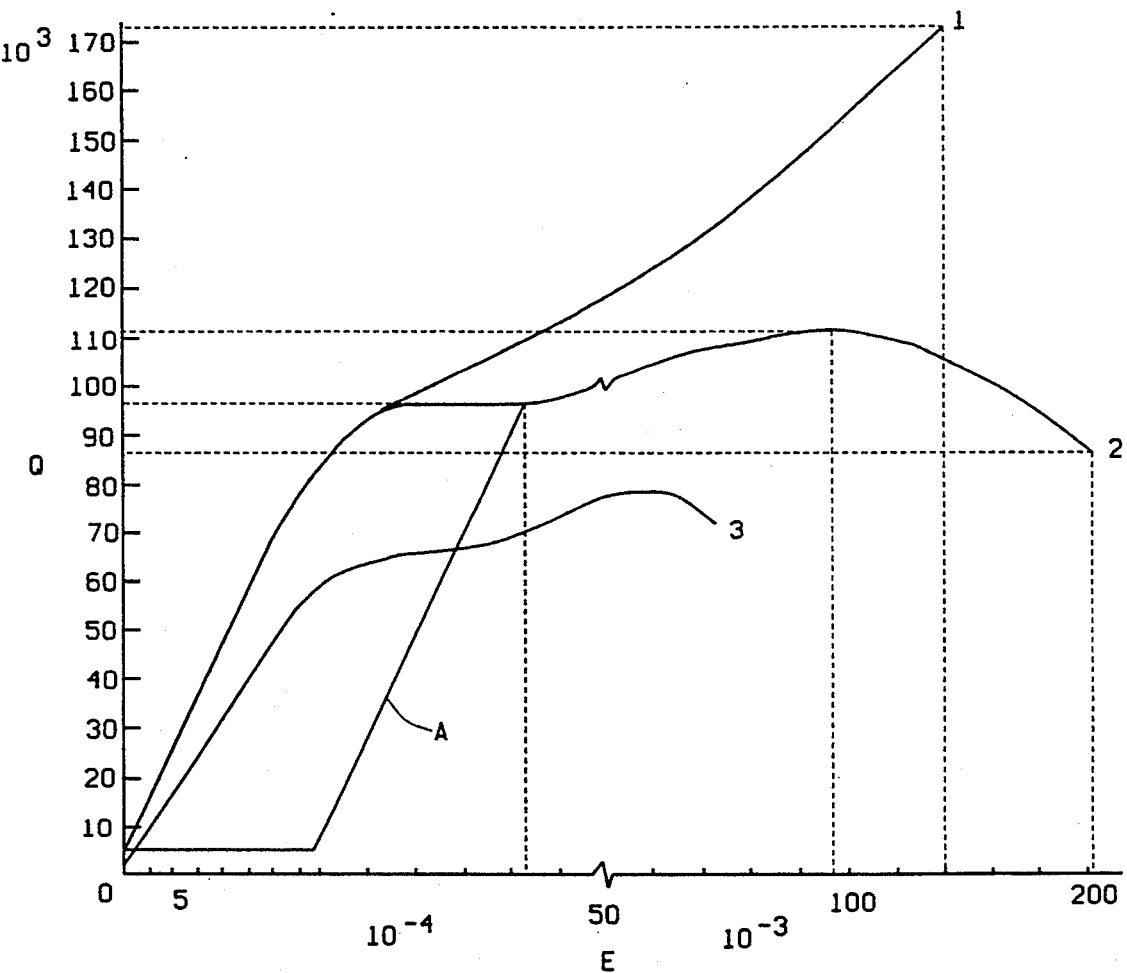
FIG. 24 shows a deformation curve for the Ni-Co-B alloy.

The deformation curve obtained from the tests is shown in FIG. 24. In the curve, line 1 is the real curve, line 2 is the theoretical curve, and line 3 is the substrate curve. The deformation curve was used to determine the following properties:

Yielding Force or Fluidity

The yielding force is the force at which the material changes in elastic behavior. A permanent deformation is established at 0.2% as the permissible deformation without altering the behavior of the component. To determine the yielding force at 0.2%, a straight line A parallel to the deformation curve is drawn to the point where it intersects the theoretical curve. For the Ni-Co-B coated substrate, the yielding force is 98000 psi or 675 MPa.

Resistance to Tension

The resistance to tension is the maximum force which is shown in the force-deformation curve. Here, the resistance is 112,000 psi or 771.41 MPa.

Resistance to Rupture

The resistance to rupture is the force at which the piece ruptures. Here the rupture force is 86,000 psi or 593.10 MPa.

Ductility

Ductility is measured by the amount of elongation before the article ruptures. Here, the article stretched from 2 inches to 2.305 inches giving a ductility of 15.25%.

The real deformation curve, line 1 of FIG. 24 plots real deformation (DR) against real tension (ER). Real deformation, DR, is $\ln(L/L_o)$ and real elongation, ER, is F/A where A is the instantaneous area to which the force is applied. At the maximum force, the test piece had a diameter of 0.427 in. and an area of 0.1432 in$^2$. The force was 22000 lbs, the real tension was 153,631 psi (1060 MPa) and the real deformation was 0.0935 in/in. At the rupture point, the diameter was 0.351 in., the area was 0.096 in$^2$, the force applied was 17000 lbs, the real tension was 175690 psi (1211 MPa), and the real deformation was 0.1410 in/in.

The resistance of the alloy to wear was determined using a disc of 4140 steel tempered in oil rotating at a rate of 160 rpm, equivalent to 50 m/min. A test weight of 50 gm. was used. No lubricant was used. The test samples were brass coated with the Ni-Co-B alloy. The coating was 55.6 microns thick. The alloy was treated as deposited, i.e. the alloy was not treated after the deposition process was completed.

Figure 25:
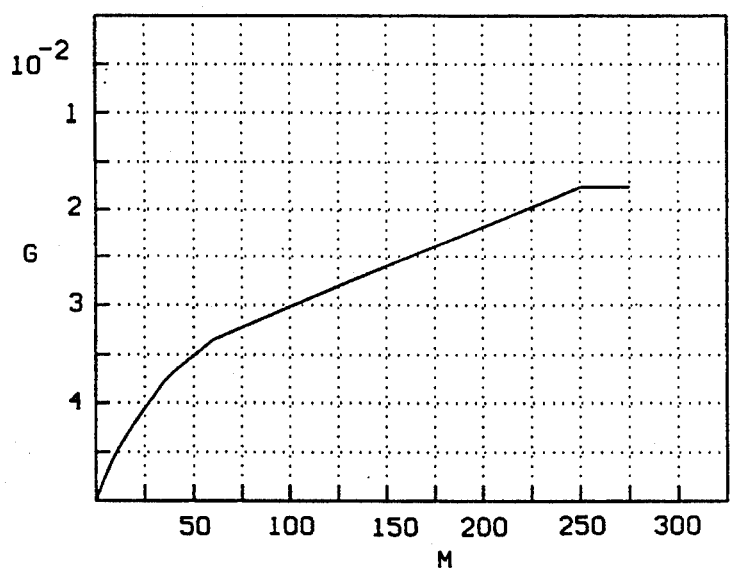
FIG. 25 shows a wear curve for the Ni-Co-B alloy deposited on a brass substrate.

The wear curve produced by the test is shown in FIG. 25. The wear factor (W) is equal to the slope of the straight portion of the curve, or $1.122 \times 10^{-4}$ g/m.

The friction factor (FF) is equal to the wear factor multiplied by a constant K. Thus, FF=WK. The constant K depends on the material tested and the conditions.

K=wT/dV where w=the test disc velocity (m/min); T=test duration (min) d=material density (g/cm$^3$); and V=material volume (cm$^3$). Thus, with w=50 m/min, T=5 min., d=8.72 g/cm$^3$, and V=0.019569 cm$^3$, K=1465 m/g. Therefore, FF=$1.122 \times 10^{-4} \times 1465 = 0.1634$.

The alloy's resistance to abrasion is determined by the equation (H/P)*FF where H=hardness and P=weight applied. The resistance to abrasion is 1.09. The hardness value is in part dependant on the substrate to which the alloy is applied. For this test, an average hardness value (VPN 100 g) of 1006 was used. P was 150g.

The wear factor may also be calculated using Archard's relation which follows the formula: W=V/S=1/KPH. Using Archard's relation, the wear factor W is $1.098 \times 10^{-4}$ which is almost identical to the wear factor of $1.122 \times 10^{-4}$ determined from the wear curve. The Archard's relation applies only to coatings which present a uniform morphology without any protruberances or any porosity. The fact that the two number are nearly the same shows that the Ni-Co-B satisfies the Archard relation.

In performing the wear test, there are two important parameters: (1) the maximum distance run which the coating can support before it breaks and leaves the substrate exposed, and (2) the total loss of weight. The pressure applied during the test was determined by various tests until a stable state of wear was obtained with a minimum of distance run. The pressure applied was 150 gms reaching a stable state at 250 m at a velocity of 50 m/min. The test lasted 5 min. Table XVII below compares wear resistance, friction coefficient, and hardness of untreated, unlubricated Ni-Co-B against other heat treated coatings.

TABLE XVII

| MATERIAL | WEAR RESISTANCE | FRICTION COEF. | HARDNESS |
|---|---|---|---|
| WATTS (electrolytic Ni) | 14.7 | 0.20 | 200 |
| electroless Ni (as deposited) | 9.6 | 0.30 | 650 |
| electroless Ni (treated at 572° F.) | 4.4 | 0.26 | — |
| electroless Ni (treated at 932° F.) | 2.7 | 0.25 | 850 |
| electroless Ni (treated at 1200° F.) | 1.3 | — | 540 |
| Hard Chrome | 2.0 | 0.20 | 900 |
| Ni—Co—B | 1.0 | 0.16 | 944–1068 |

As can be seen from the table, the untreated Ni-Co-B is harder than, wears better than, and has a lower friction coefficient than heat treated nickel, chrome, and electrolytic nickel, materials which are commonly used to protect substrates.

From the foregoing discussion, it will be appreciated that the present invention provides a novel and unique alloy, implement, plating solution and method for making same which provides the aforementioned advantageous results and achieves the objects and features of this invention.

Various changes can be made in the above compositions, products and methods, as well as in the disclosed ranges of the present invention, without departing from the scope of the appended claims. For example, the tank 8 can be scaled up in size. Further, the same alloy may be made by chemical plasma deposition.

I claim:

1. In the method of producing a gas by dissociating an electrolyte in a solution by electrolysis, the method comprising providing at least two electrodes, exposing the solution containing the electrolyte to the electrodes, and applying a voltage across the electrodes, wherein the gas is produced by dissociation of the electrolyte, the improvement wherein at least one of the electrodes is plated with a crystalline ternary alloy consisting essentially of nickel, cobalt, and boron, the plated alloy being a homogeneous crystalline structure comprising nickel and cobalt borides being contained in a matrix of nickel-cobalt.

2. The method of claim 1 wherein the alloy consists essentially of, by weight, approximately 50-75% nickel, approximately 25-50% cobalt, and approximately 1—5% boron at an outermost surface of the alloy.

3. The method of claim 1 wherein the alloy consists essentially of, by weight, 50-75% Ni$_2$B and 25-50% Co$_2$B in the crystalline structures.

4. The method of claim 1 wherein said alloy provides a voltage-current density slope of less then 10 Vcm$^2$/Amp.

5. The method of claim 4 wherein both said electrodes are plated with said ternary alloy.

6. The method of claim 4 wherein said gas is chosen from the group consisting of hydrogen and halogens.

7. The method of claim 6 wherein said gas is hydrogen and said electrolyte comprises an aqueous hydroxide or an acid.

8. The method of claim 7 wherein said aqueous hydroxide is chosen from the group consisting essentially of KOH and NaOH.

9. The method of claim 7 wherein said acid is H$_2$SO$_4$.

10. The method of claim 6 wherein said gas is chlorine and said aqueous electrolite is a chlorine salt.

11. The method of claim 10 wherein said chlorine salt is NaCl.

* * * * *